US 12,256,684 B2

(12) United States Patent
Lim et al.

(10) Patent No.: US 12,256,684 B2
(45) Date of Patent: Mar. 25, 2025

(54) PLANT CULTIVATION APPARATUS

(71) Applicant: LG ELECTRONICS INC., Seoul (KR)

(72) Inventors: Ki Young Lim, Seoul (KR); Tae Yang Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 107 days.

(21) Appl. No.: 17/771,164

(22) PCT Filed: Aug. 12, 2020

(86) PCT No.: PCT/KR2020/010694
§ 371 (c)(1),
(2) Date: Apr. 22, 2022

(87) PCT Pub. No.: WO2021/080139
PCT Pub. Date: Apr. 29, 2021

(65) Prior Publication Data
US 2022/0361419 A1 Nov. 17, 2022

(30) Foreign Application Priority Data
Oct. 22, 2019 (KR) .................. 10-2019-0131606

(51) Int. Cl.
A01G 9/24 (2006.01)

(52) U.S. Cl.
CPC ............ A01G 9/247 (2013.01); A01G 9/246 (2013.01); A01G 9/249 (2019.05)

(58) Field of Classification Search
CPC ................................ A01G 9/246; A01G 9/247
See application file for complete search history.

(56) References Cited

U.S. PATENT DOCUMENTS

| 6,725,598 B2 * | 4/2004 | Yoneda | A01G 31/02 47/60 |
| 7,549,300 B2 * | 6/2009 | Chun | F25D 23/003 62/428 |
| 10,524,433 B2 * | 1/2020 | Spiro | A01G 22/00 |
| 10,806,100 B1 * | 10/2020 | Trtilek | A01G 9/246 |

(Continued)

FOREIGN PATENT DOCUMENTS

| CN | 203827829 | 9/2014 |
| CN | 109803527 | 5/2019 |

(Continued)

OTHER PUBLICATIONS

International Search Report and Written Opinion dated Nov. 18, 2020 issued in PCT Application No. PCT/KR2020/010694.

(Continued)

Primary Examiner — Monica L Perry
Assistant Examiner — Katherine Anne Kloecker
(74) Attorney, Agent, or Firm — KED & ASSOCIATES, LLP

(57) ABSTRACT

A plant cultivation apparatus of the present disclosure is proposed. In the plant cultivation apparatus, a machine chamber is configured to be open forward of the cabinet so that indoor air is suctioned and discharged therethrough. Accordingly, even when the plant cultivation apparatus is provided in a specific place in a built-in method, air circulation is smoothly performed.

20 Claims, 16 Drawing Sheets

(56) References Cited

U.S. PATENT DOCUMENTS

| | | | |
|---|---|---|---|
| 11,058,070 B2* | 7/2021 | Loessl | A01G 25/16 |
| 11,109,540 B2* | 9/2021 | Aminpour | A01G 9/26 |
| 2014/0259904 A1 | 9/2014 | Collard | |
| 2016/0212954 A1* | 7/2016 | Argento | A01G 31/06 |
| 2018/0125018 A1 | 5/2018 | Leung et al. | |
| 2019/0183062 A1* | 6/2019 | Pham | A01G 9/022 |
| 2021/0007305 A1* | 1/2021 | Adams | A01G 27/06 |
| 2021/0360888 A1* | 11/2021 | Farmer | A01G 9/047 |

FOREIGN PATENT DOCUMENTS

| | | |
|---|---|---|
| CN | 110024683 A * | 7/2019 |
| KR | 20-0157461 | 9/1999 |
| KR | 10-0674737 | 1/2007 |
| KR | 10-0997722 | 12/2010 |
| KR | 10-2012-0007420 | 1/2012 |
| KR | 10-2012-0028040 | 3/2012 |
| KR | 10-2012-0094184 | 8/2012 |
| KR | 20-0465385 | 2/2013 |
| KR | 10-1240375 | 3/2013 |
| KR | 20-0467246 | 6/2013 |
| KR | 10-1400375 | 6/2014 |
| KR | 10-1422636 | 7/2014 |
| KR | 10-1451343 | 10/2014 |
| KR | 10-1820408 | 1/2018 |
| KR | 101954251 | 3/2019 |
| KR | 102021578 | 9/2019 |

OTHER PUBLICATIONS

Extended European Search Report dated Oct. 31, 2023 issued in Application No. 20878924.8.

* cited by examiner

[Fig. 2]
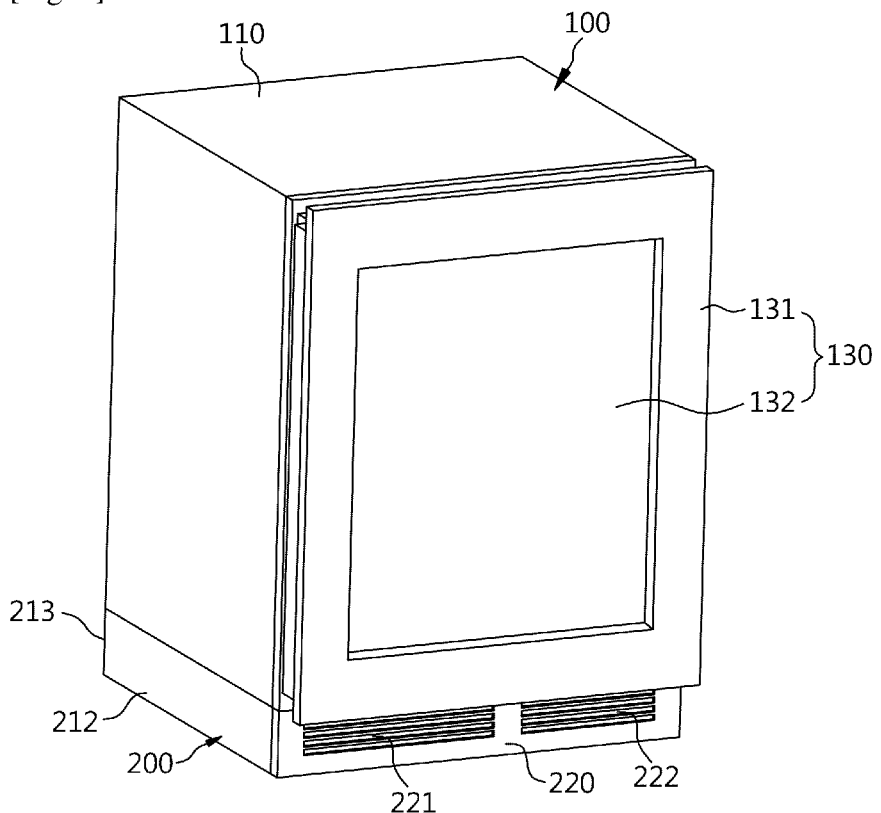
[Fig. 3]
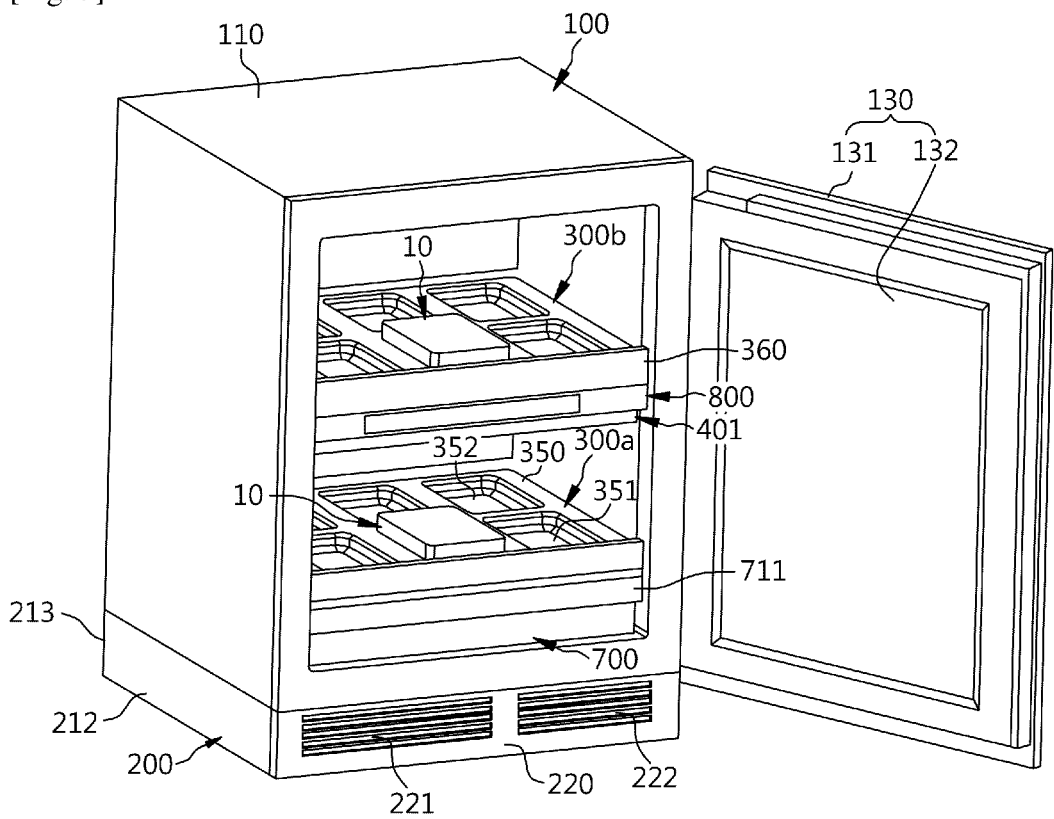

[Fig. 4]
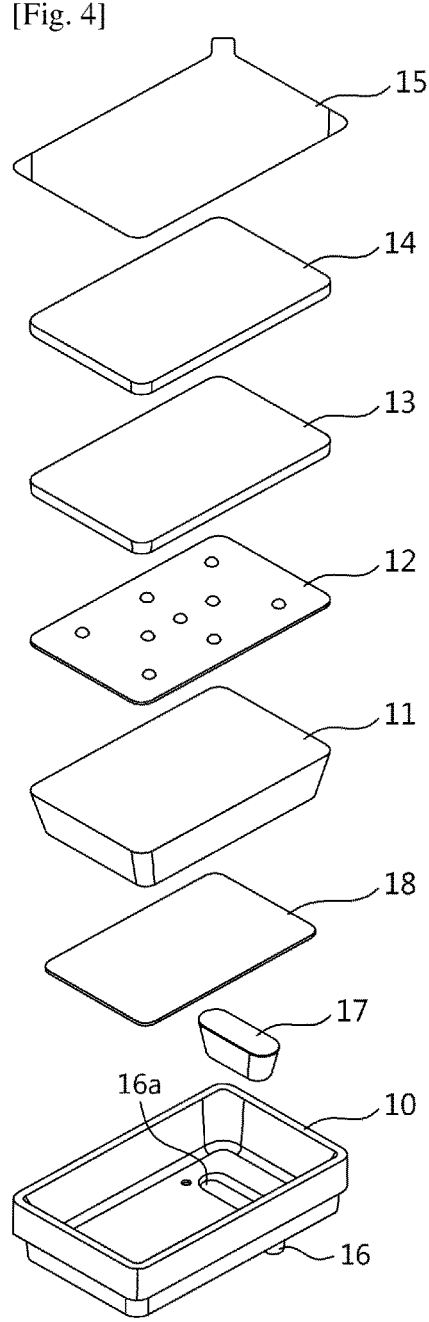
[Fig. 5]
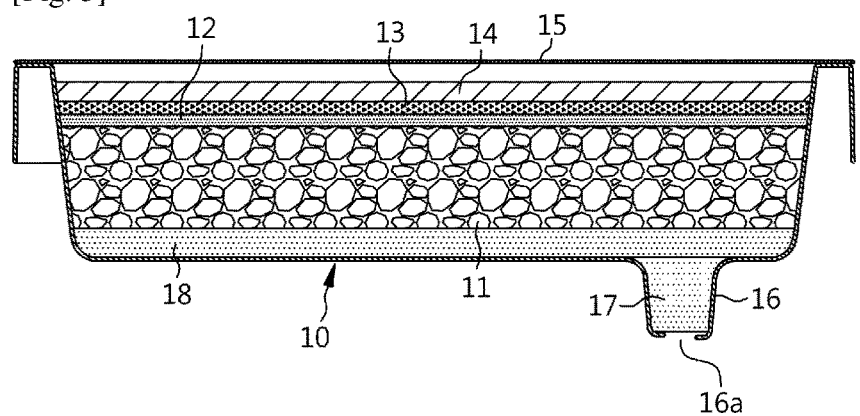

[Fig. 6]
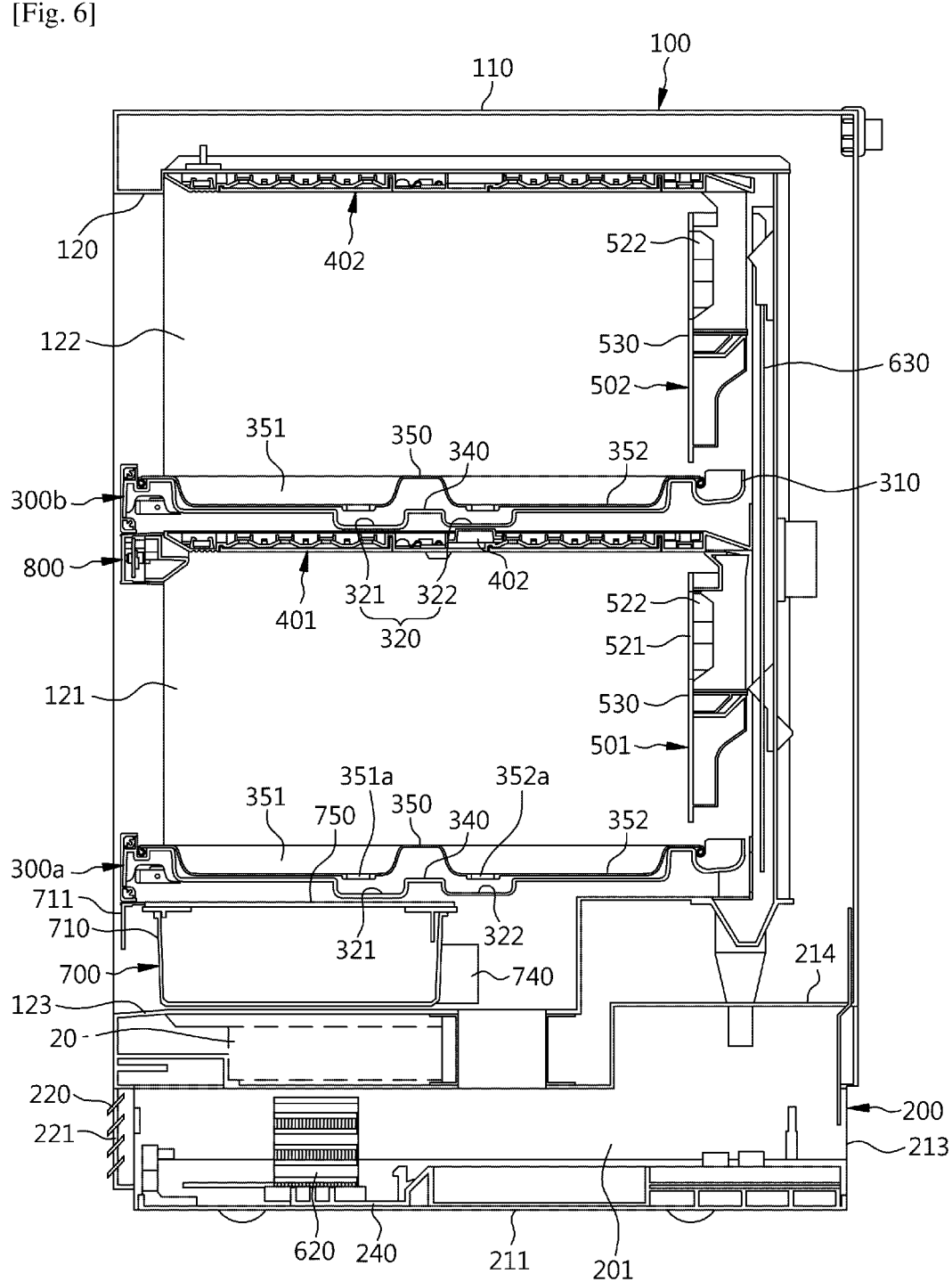

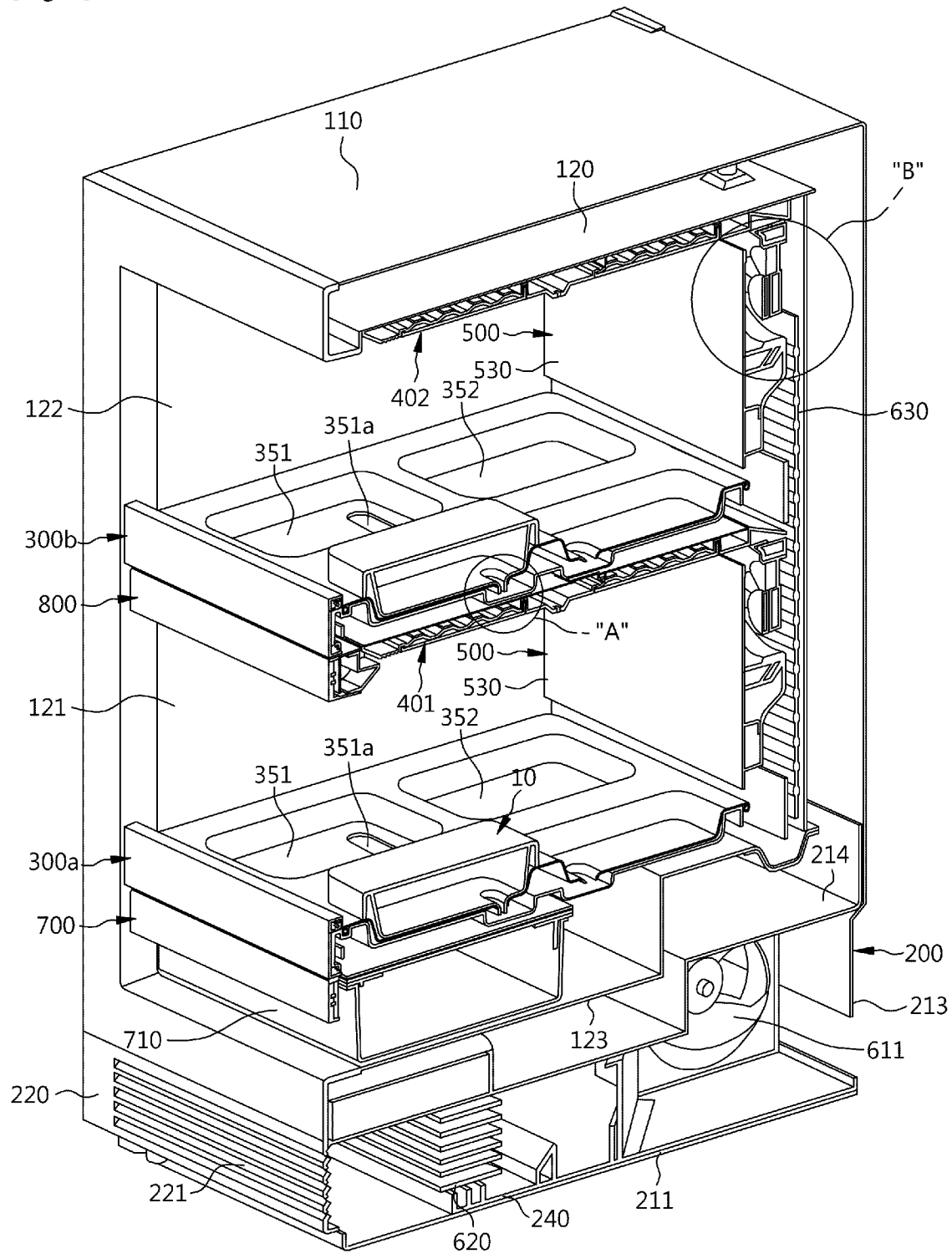
[Fig. 7]

[Fig. 8]
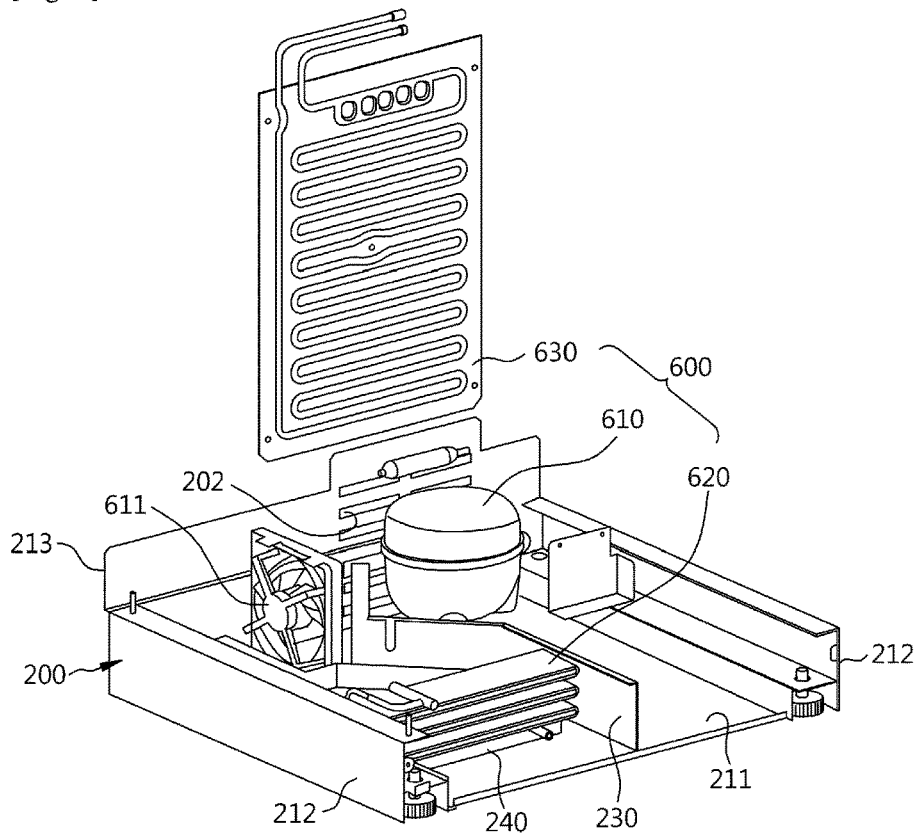
[Fig. 9]
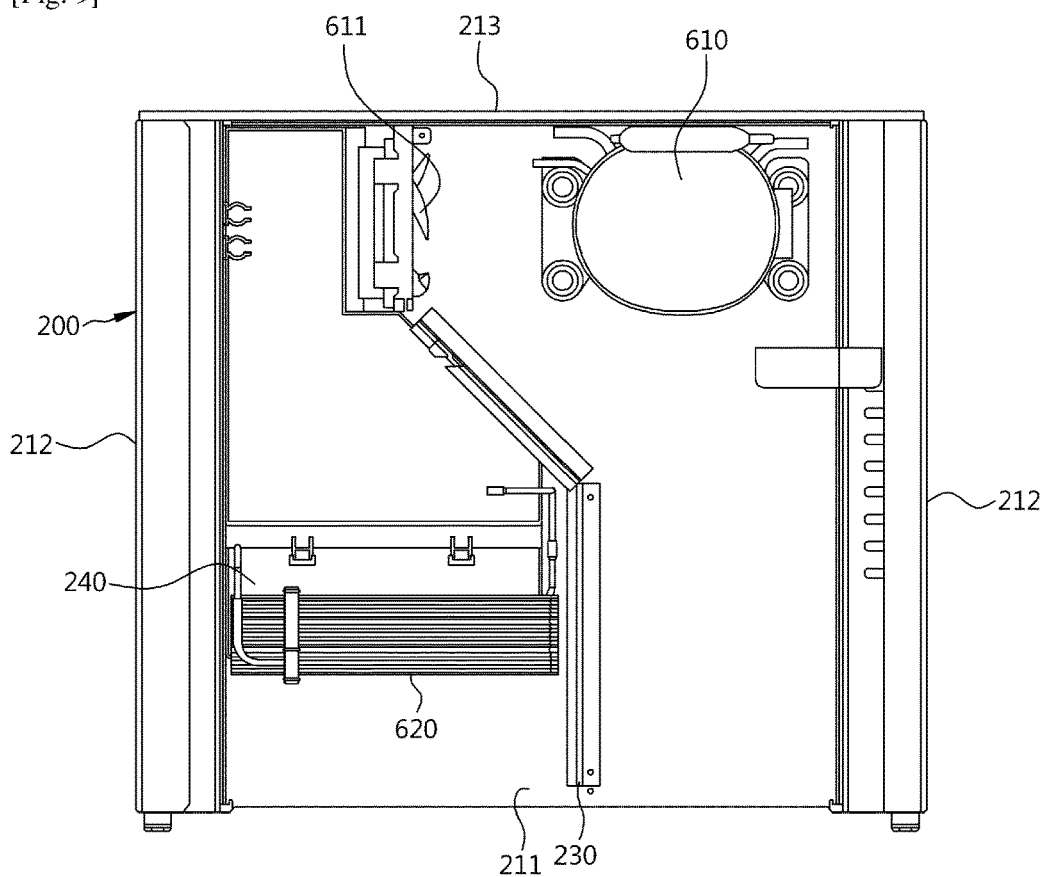

[Fig. 10]
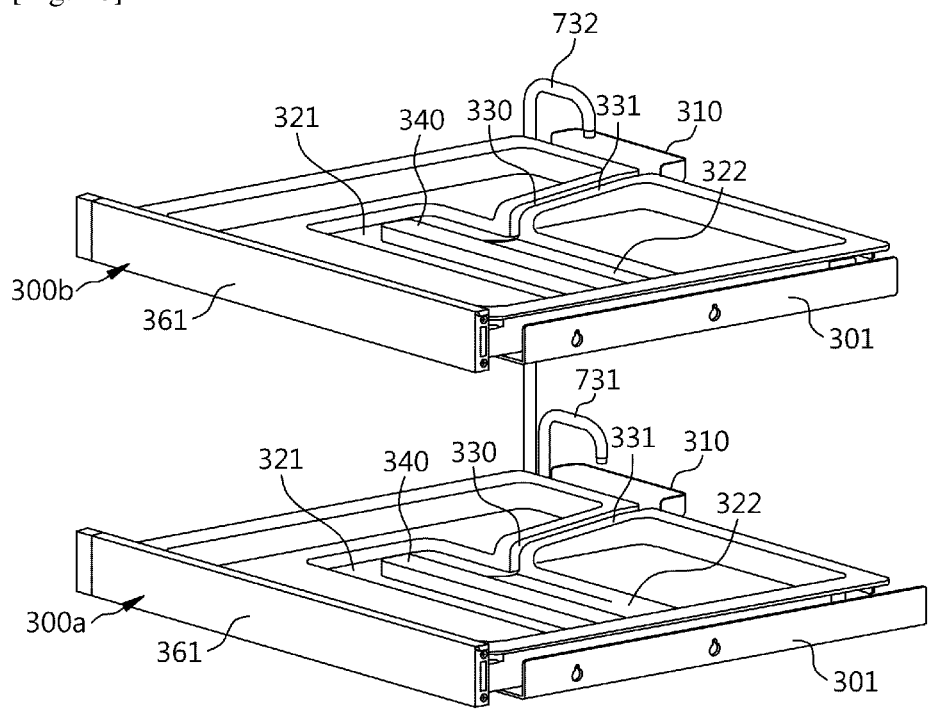
[Fig. 11]
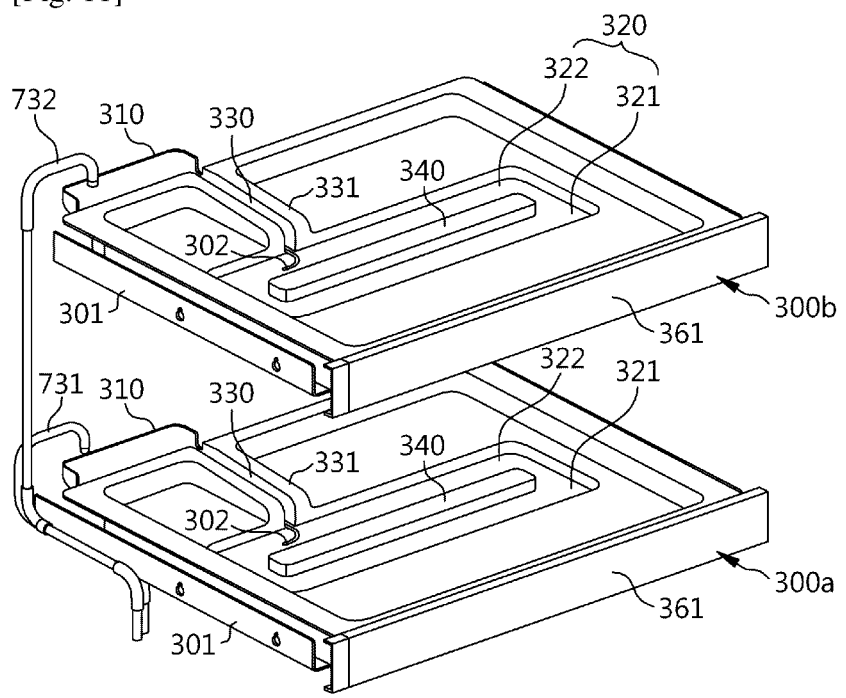

[Fig. 12]
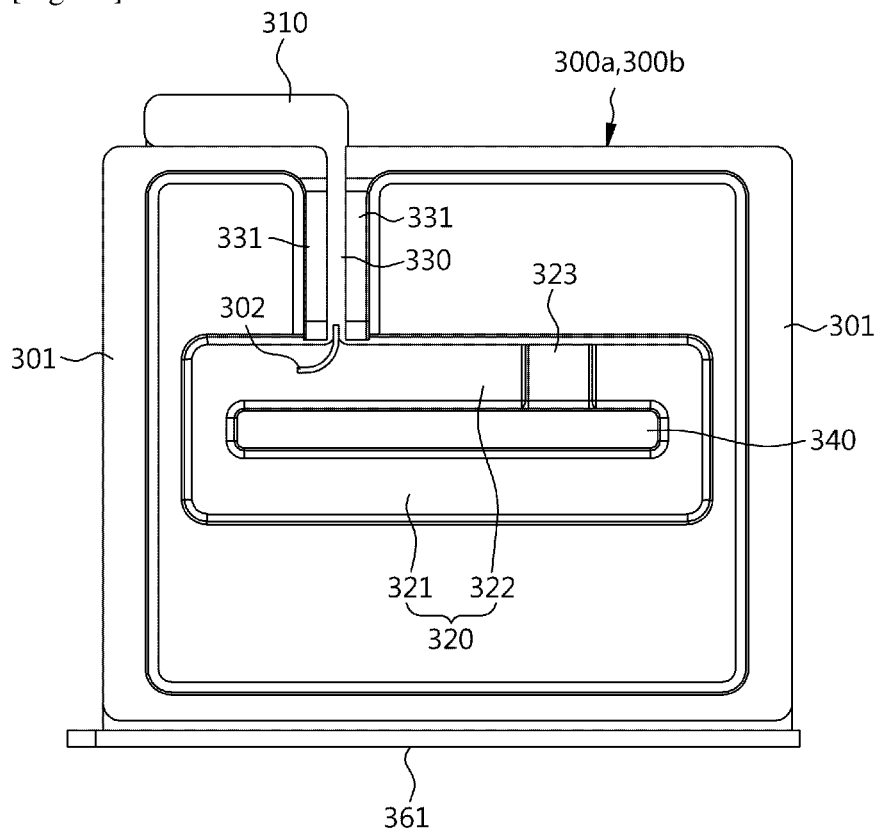
[Fig. 13]
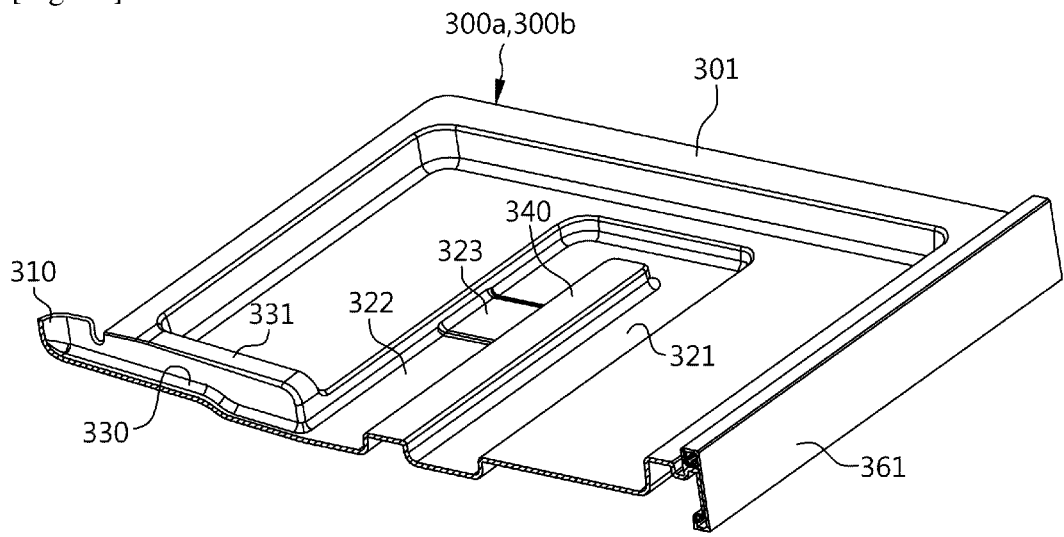
[Fig. 14]
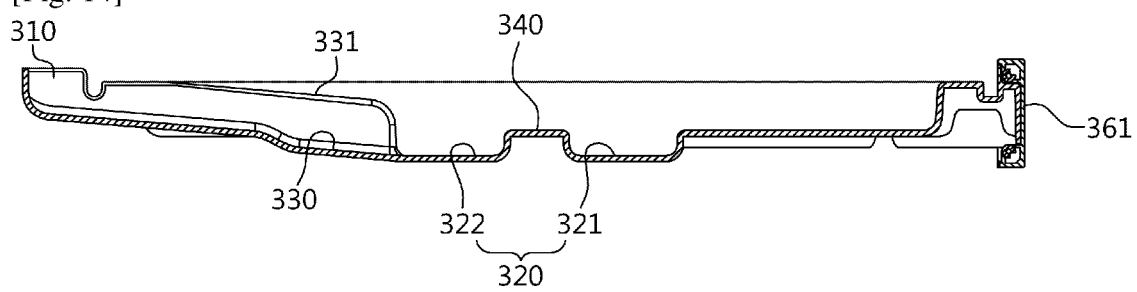

[Fig. 15]
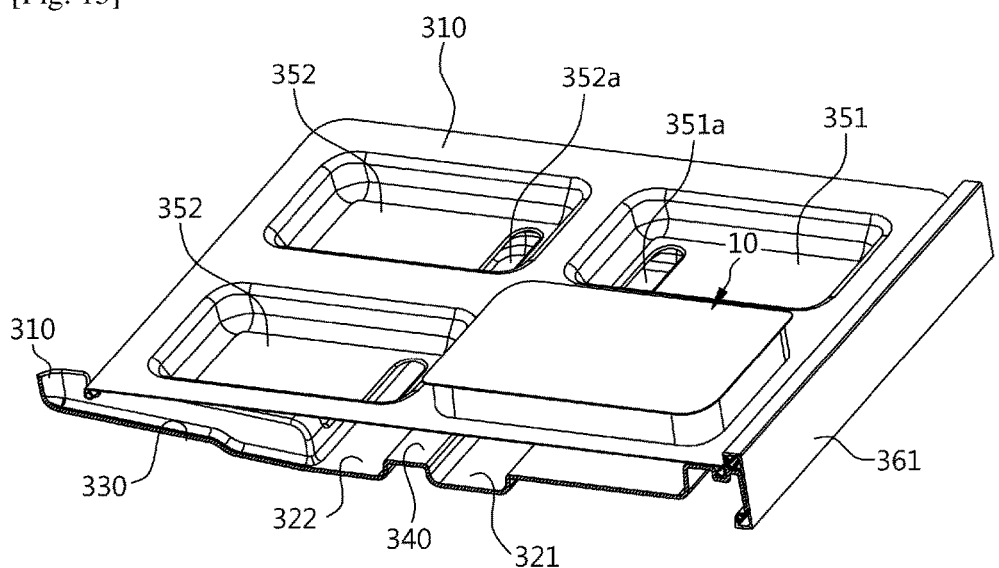
[Fig. 16]
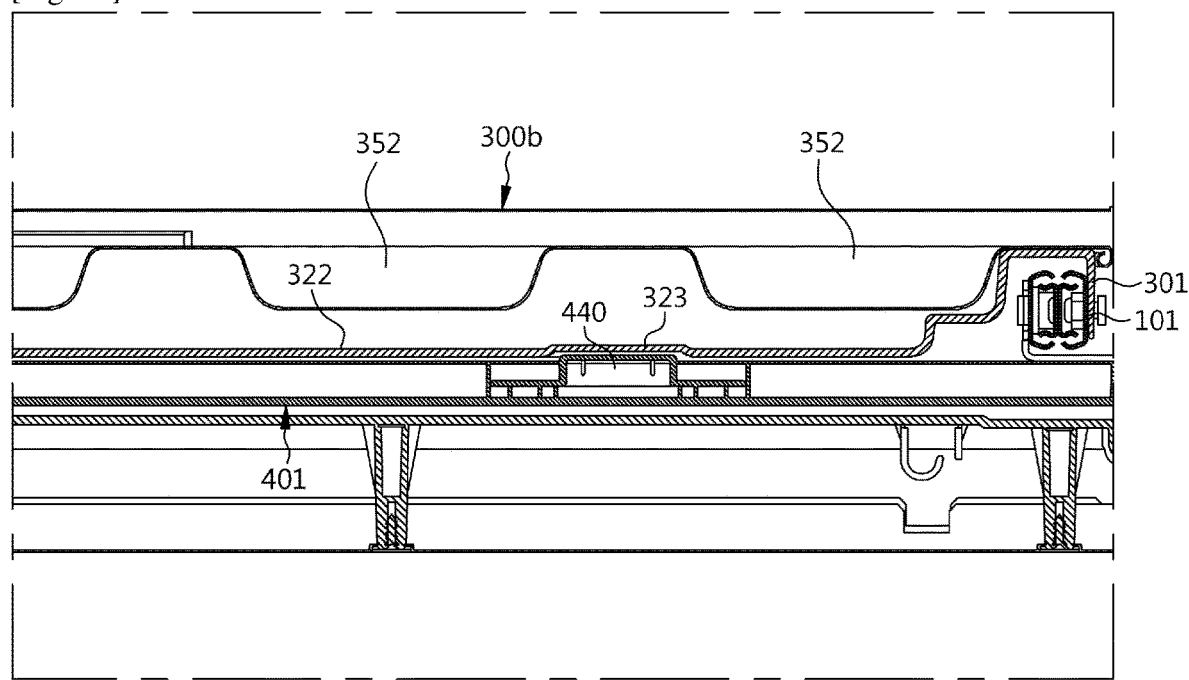

[Fig. 17]
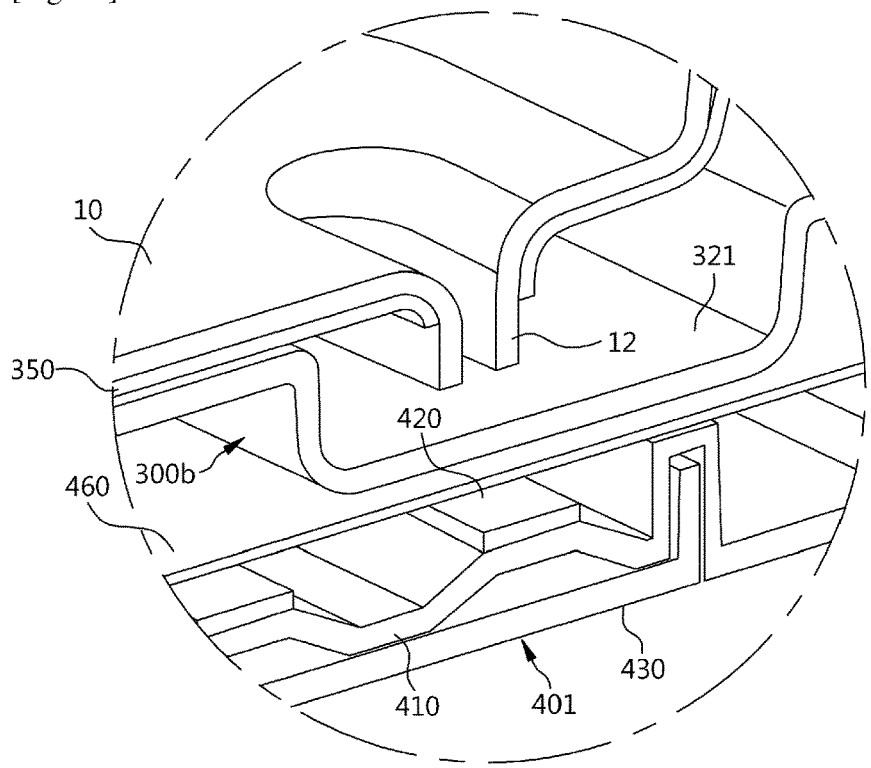
[Fig. 18]
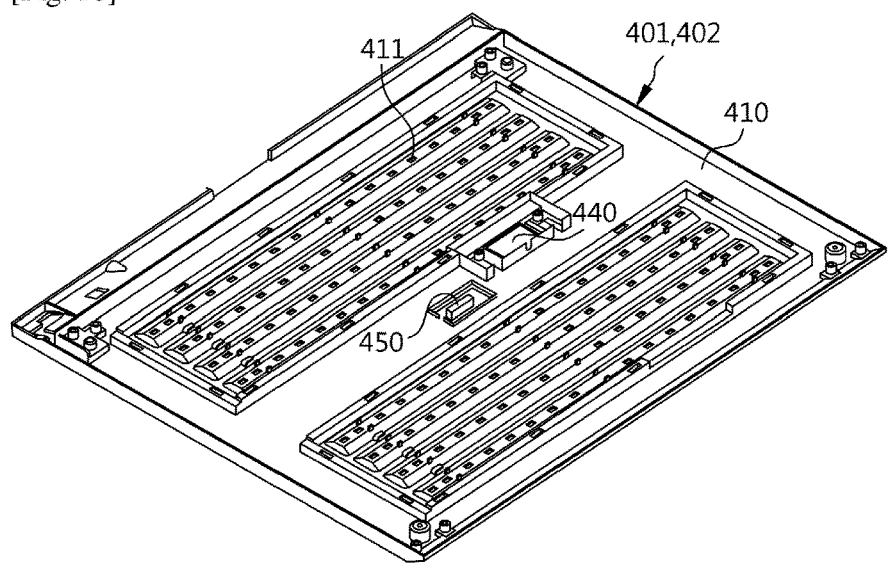
[Fig. 19]
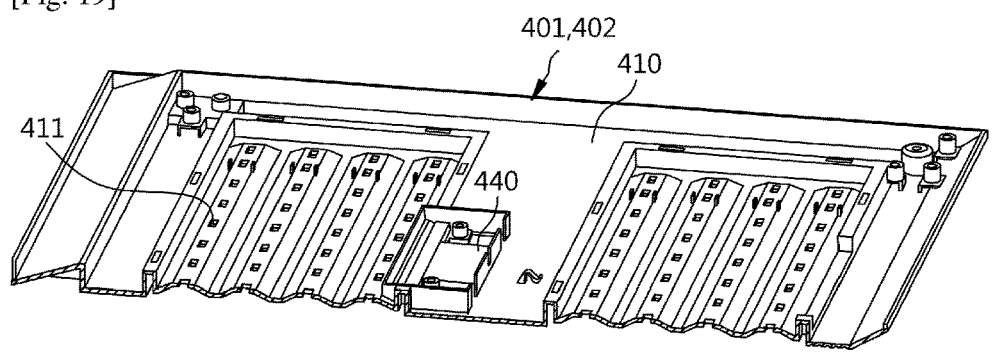

[Fig. 20]
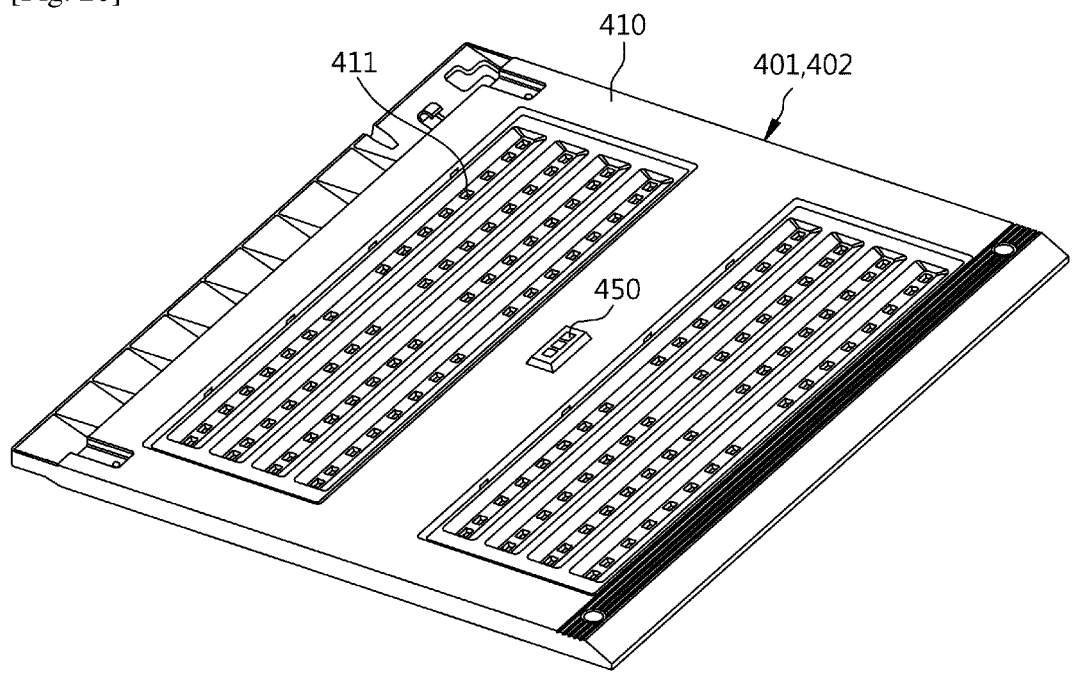
[Fig. 21]
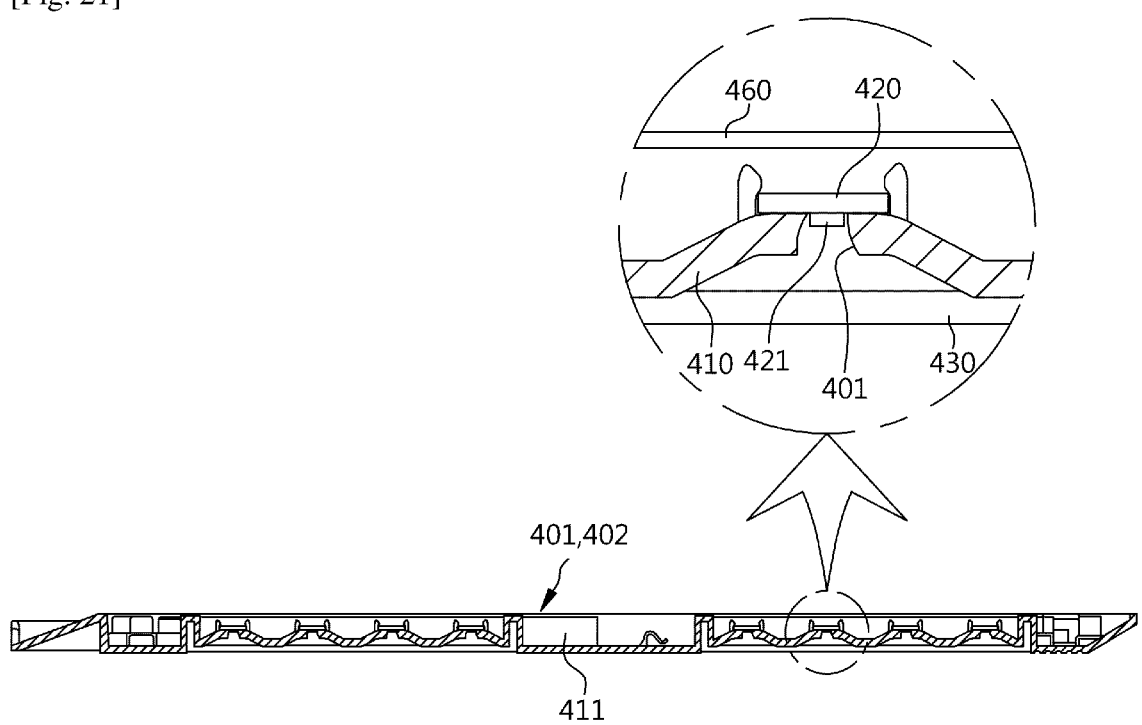

[Fig. 22]
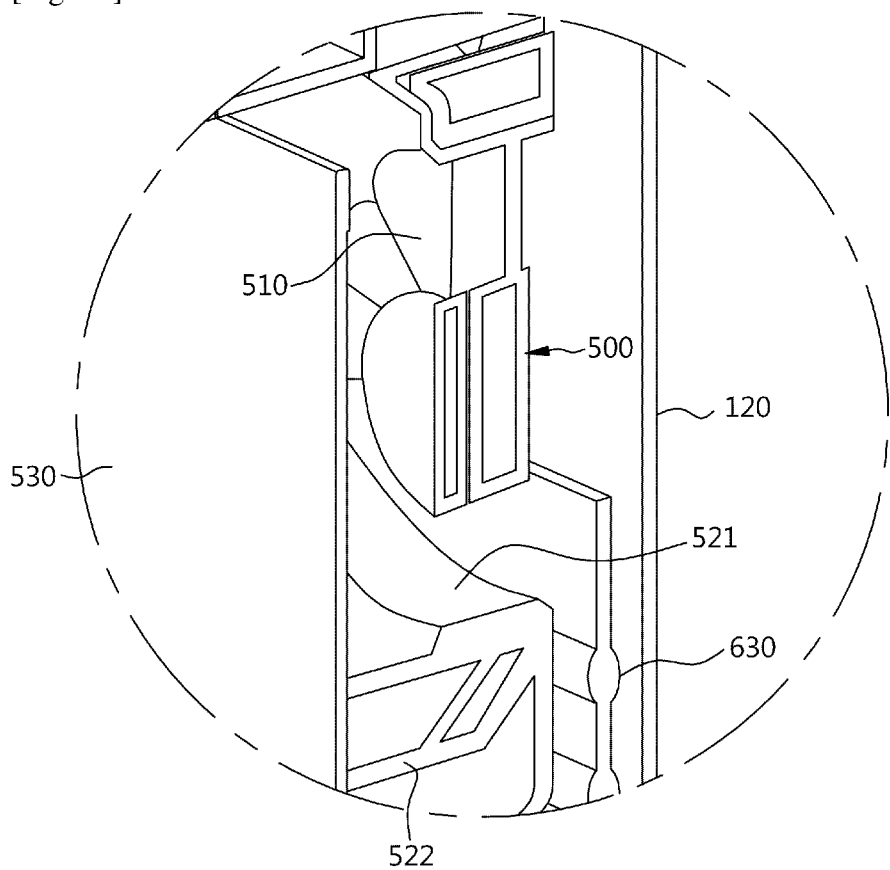
[Fig. 23]
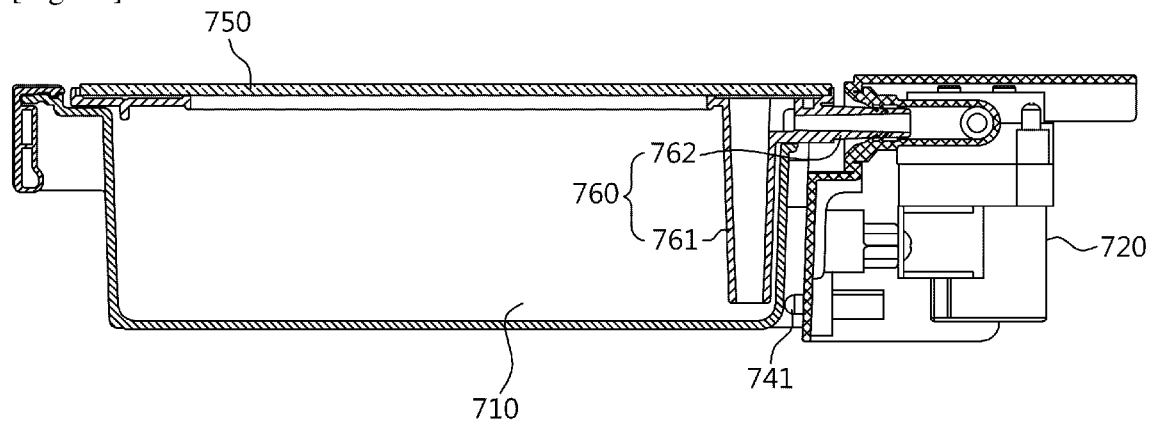

[Fig. 24]
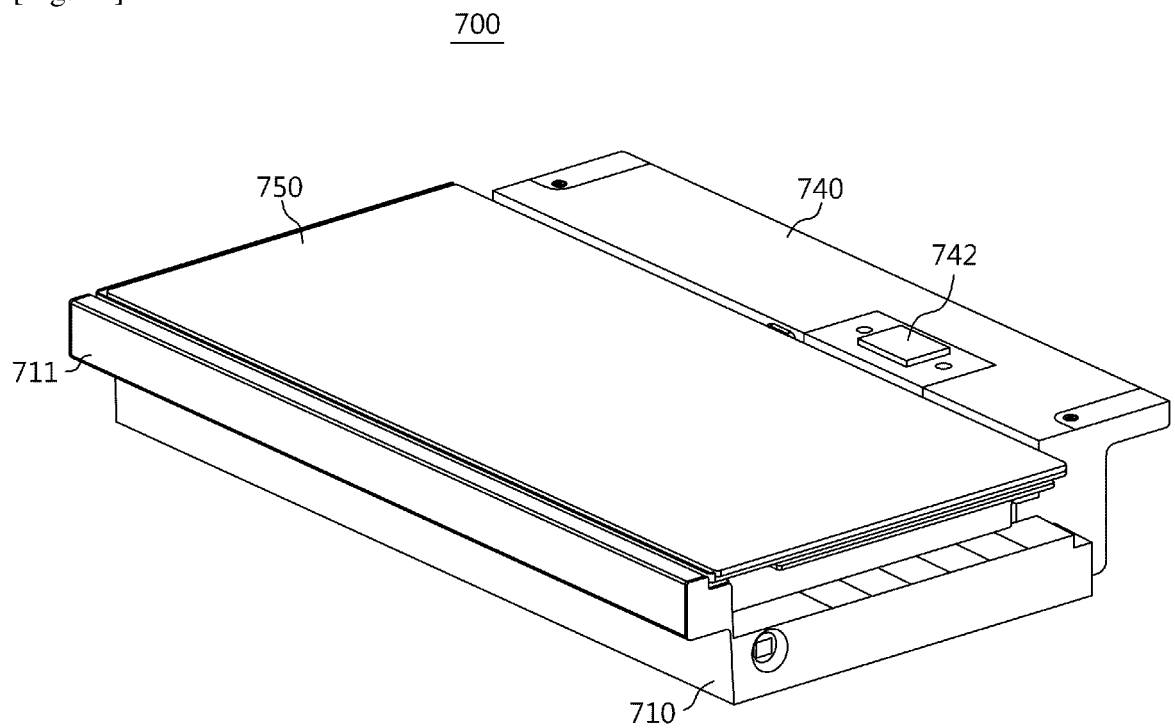
[Fig. 25]
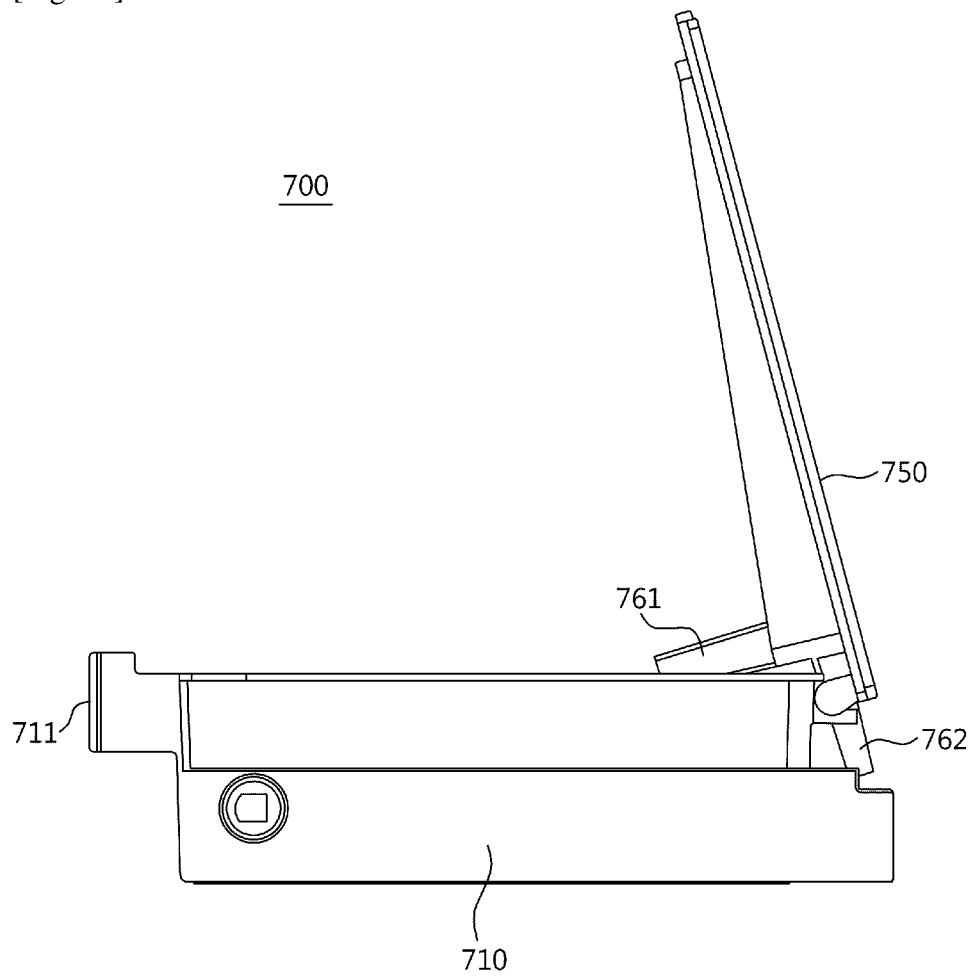

[Fig. 26]
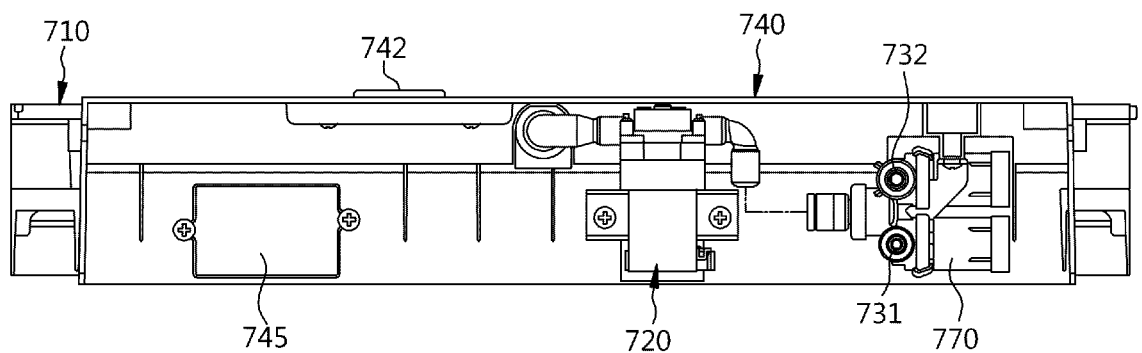
[Fig. 27]
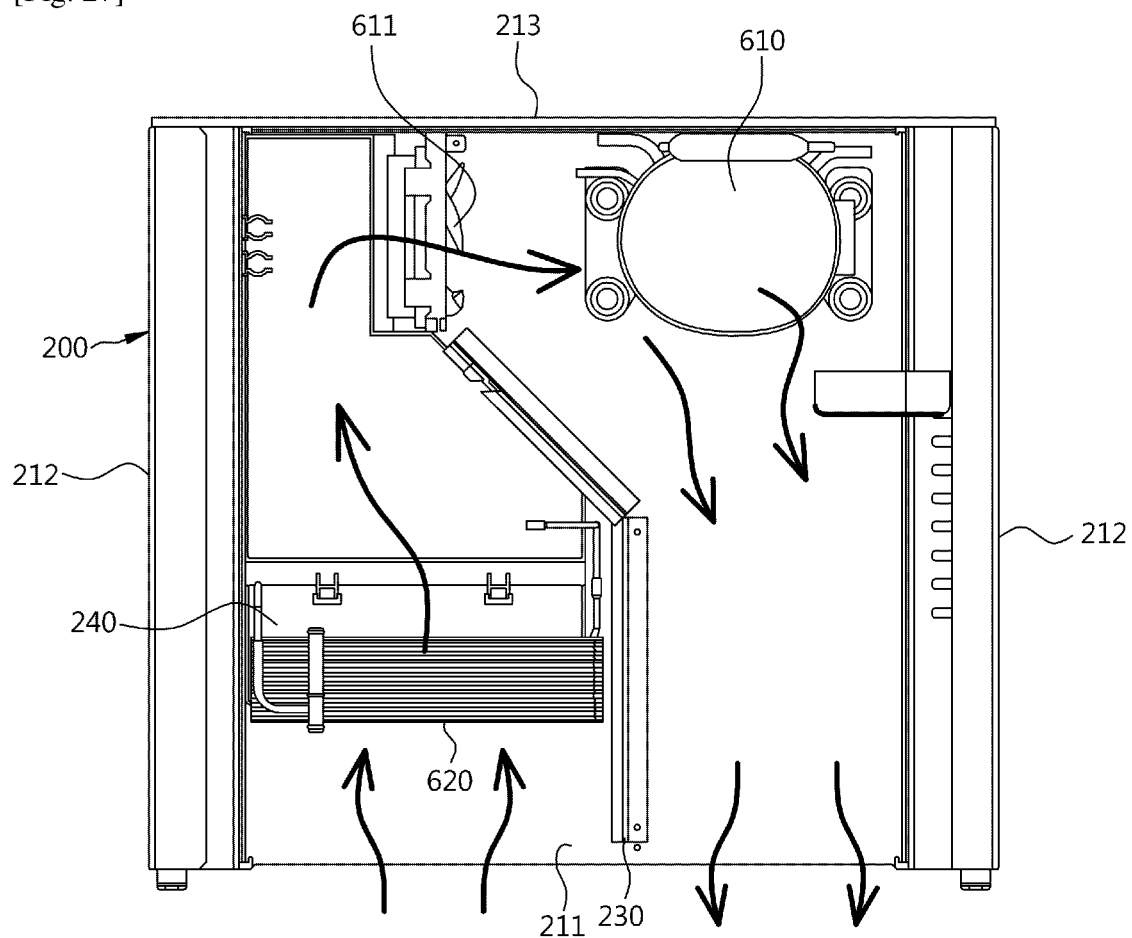

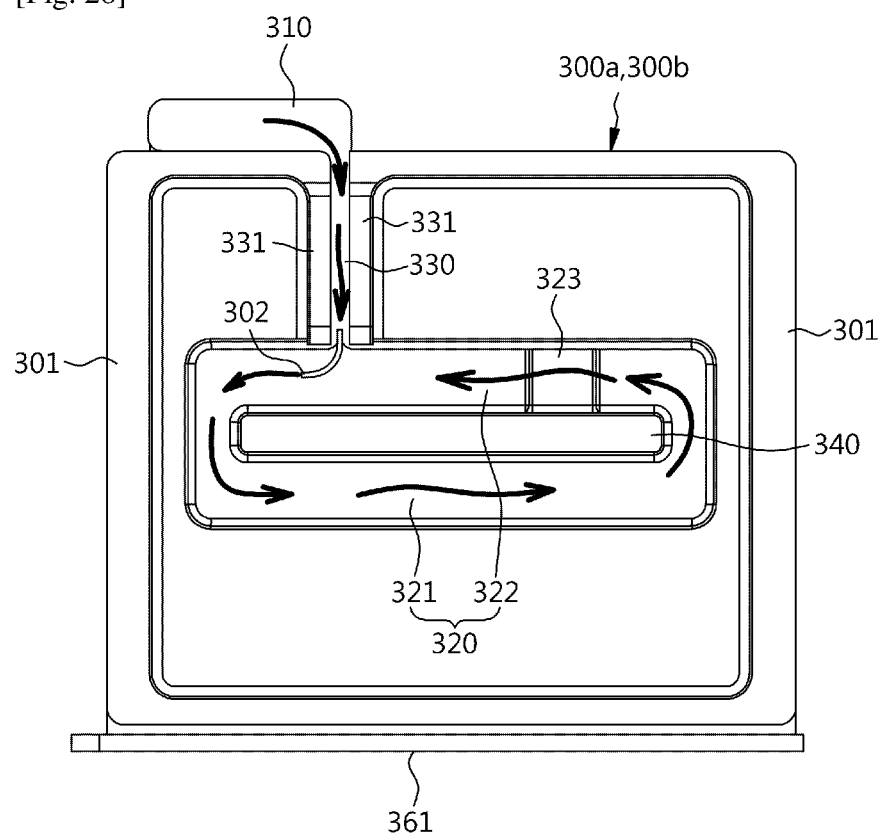

[Fig. 29]
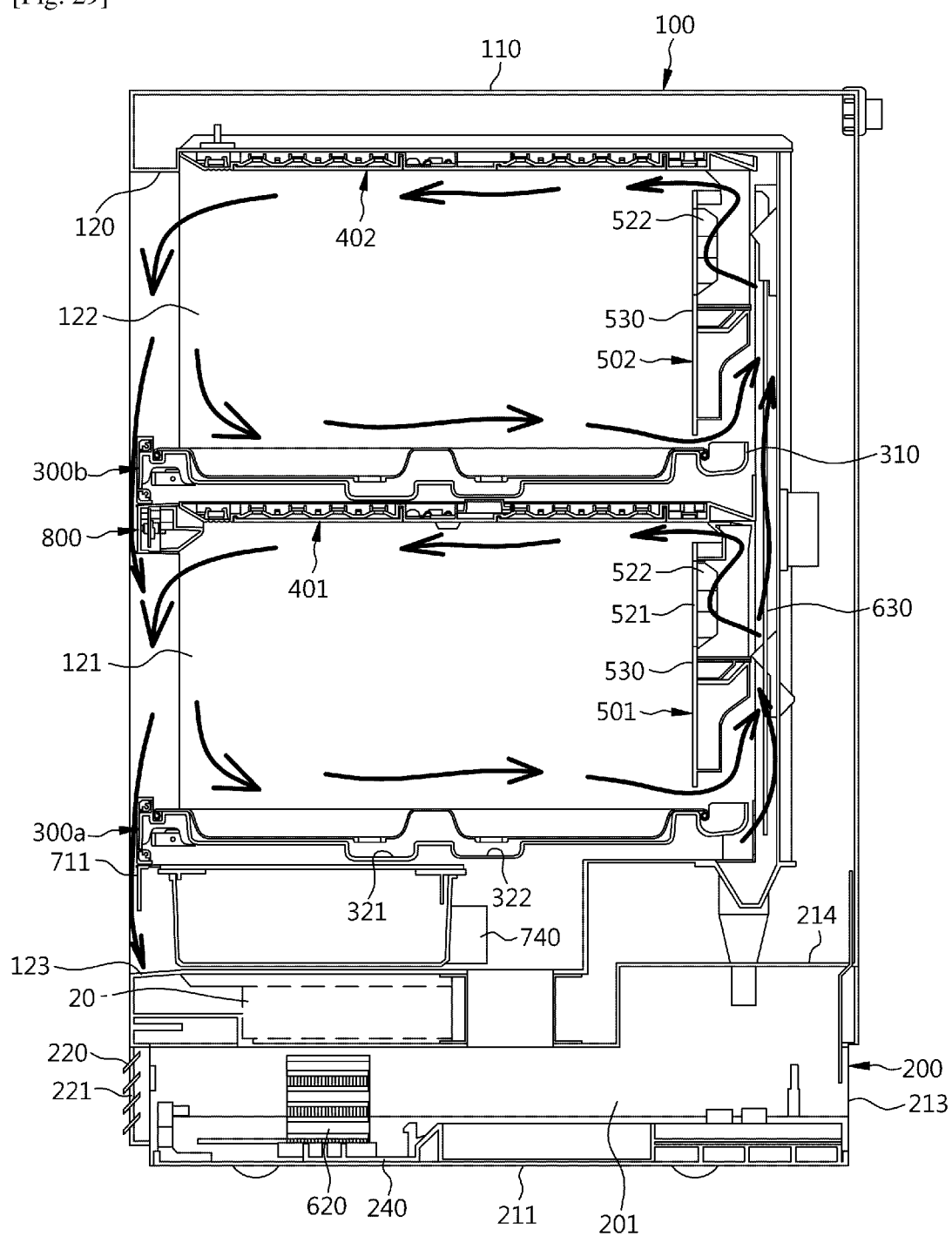

PLANT CULTIVATION APPARATUS

CROSS-REFERENCE TO RELATED PATENT APPLICATIONS

This application is a U.S. National Stage Application under 35 U.S.C. § 371 of PCT Application No. PCT/KR2020/010694, filed Aug. 12, 2020, which claims priority to Korean Patent Application No. 10-2019-0131606, filed Oct. 22, 2019, whose entire disclosures are hereby incorporated by reference.

TECHNICAL FIELD

The present disclosure relates generally to a plant cultivation apparatus capable of automatically performing air circulation, light supply, and water supply for plant cultivation.

BACKGROUND ART

Generally, a plant cultivation apparatus is a device cultivating plants in a seed state.

Recently, the plant cultivation apparatus has been provided in various forms that may easily cultivate plants indoors.

The indoor plant cultivation apparatus may be classified into a hydroponic cultivation apparatus and a soil cultivation apparatus.

The hydroponic cultivation apparatus is a device that cultivates a plant by a method in which roots of a plant are immersed in water mixed with a nutrient solution, as proposed in Korean Patent Application Publication No. 10-2012-0007420 (document 1), Korean Patent Application Publication No. 10-2012-0028040 (document 2), Korean Patent No. 10-1240375 (document 3), and Korean Patent No. 10-1422636 (document 4).

However, in the case of the hydroponic cultivation apparatus such as documents 1 to 4, when supply water in which the roots of the plant are immersed is used without continuous circulation or replacement, contamination of the supply water, such as green algae, may occur. The contamination of the supply a water may cause odor.

Further, the soil cultivation apparatus is a device using a cultivation method of planting a plant (or seeds) in soil of a pot and continuously supplying water to the pot, as proposed in Korean Patent No. 10-1400375 (document 5), Korean Utility Model Registration No. 20-0467246 (document 6), and Korean Utility Model Registration No. 20-0465385 (document 7).

In this case, compared to the hydroponic cultivation apparatus using nutrient solution, the soil cultivation apparatus may further improve growth of a plant due to nutrients in the soil and increase the growth rate of the plant.

However, in the case of above-described documents 5 and 7, the soil cultivation apparatus may be operated such that, supply water sufficiently stored in a water storage is supplied to the soil in culture ground by using an absorbing member, without periodically supplying water to the soil. In the case of document 6, since the soil cultivation apparatus is provided such that a plug tray is supplied in a state of being immersed in nutrient solution of a supply bed, the soil in the culture ground (or plug tray) may be discharged outward of the plant cultivation apparatus so that sufficient soil may not be provided.

In addition, in the case of documents 5 to 7, considering that nutrient solution is supplied into the supply water stored in the water storage, contamination of the supply water due to deterioration of the nutrient solution may occur.

Further, in documents 5 and 7, a circulation structure of pumping the supply water stored in the water storage of a growth chamber and supplying the supply water to each water storage is proposed. Therefore, when the supply water stored in the water storage of the growth chamber is contaminated, supply water stored in other water storages may be easily contaminated.

Further, in documents 5 to 7, due to a water supply hose connected to the water storage (or nutrient solution container), the water storage may not be taken out of a cabinet. When the washing of the water storage is not continuously performed, contamination of the supply water may occur severely.

Meanwhile, the conventional indoor plant cultivation apparatus is exposed to the indoor environment, so that the cultivation apparatus may be affected by the indoor temperature, humidity, or brightness.

That is, the growth of plants may have a great effect on the indoor temperature.

Accordingly, the conventional hydroponic or soil cultivation apparatus is provided with a lighting device in order to always provide predetermined light, and additionally provided with a door in the cabinet to open and close the cabinet.

However, the closed-type cultivation apparatus may have a problem that air circulation is not smoothly performed and plants do not grow properly.

For example, in the night, even though the plants should be supplied with sufficient carbon dioxide, air circulation may not be smoothly performed, such as insufficient carbon dioxide due to the closed environment.

Further, the cultivation apparatus according to the above-described related arts (hydroponic cultivation apparatus, soil cultivation apparatus, closed-type cultivation apparatus, etc.) may have the limitation of installation place.

That is, as shown in documents 3 to 7, in the case of the cultivation apparatus capable of temperature control or air circulation, as the structure for supplying or discharging air is not considered at the time of built-in installation, when the cultivation apparatus is provided in a built-in type, such as a sink or a closet, air supply into the cabinet may not be smoothly provided, thereby installation of the plant cultivation apparatus may be performed only in open areas.

DISCLOSURE OF INVENTION

Technical Problem

Accordingly, the present disclosure has been made keeping in mind the above problems occurring in the related art, and the present disclosure is intended to provide a new type plant cultivation apparatus, wherein even when the plant cultivation apparatus is provided in a specific place, for example, it may be installed in a narrow place in a built-in method, air circulation may be smoothly performed and maintenance may be easily performed.

Another objective of the present disclosure is to provide a plant cultivation apparatus of a new form, which may be configured to always properly supply water to plants.

A further objective of the present disclosure is to provide a plant cultivation apparatus of a new form, which may be configured as a non-circulating structure in which the supplied water may be normally stored in a separate water tank, which is blocked from the outside environment, and the supplied water being supplied to the plants when necessary, so that contamination of the supply water may be prevented.

Still another objective of the present disclosure is to provide a plant cultivation apparatus of a new form, which may be configured to control the temperature required for plant cultivation so that various plants may be cultivated.

Still another objective of the present disclosure is to provide a plant cultivation apparatus of a new form, which may separately perform the temperature control for each cultivation area of each layer.

Still another objective of the present disclosure is to provide a plant cultivation apparatus of a new form, which may be configured to easily supply water and wash the water tank provided to store the supply water.

Solution to Problem

In the plant cultivation apparatus of the present disclosure, a water tank may be positioned to be drawable on the bottom in a cabinet.

Further, in the plant cultivation apparatus of the present disclosure, a first bed may be positioned to be drawable above the water tank.

Further, in the plant cultivation apparatus of the present disclosure, a first lighting module may be positioned above the first bed.

Thus, the entire structure of the plant cultivation apparatus may be maximally simplified and washing and maintenance of each configuration may be easily performed.

Further, in the plant cultivation apparatus of the present disclosure, bed soil of a pod where a plant is planted may contain nutrient solution. Thus, the nutrient solution is supplied to the plant when water is supplied to the pod, so that odor due to the nutrient solution may be prevented.

Further, in the plant cultivation apparatus of the present disclosure, suction and discharge of indoor air may be performed forward of the apparatus. Thus, the plant cultivation apparatus may be used as a built-in product.

Further, in the plant cultivation apparatus of the present disclosure, indoor air may be configured to flow into a machine chamber through an open front portion of the machine chamber.

Further, in the plant cultivation apparatus of the present disclosure, the air flowing into the machine chamber may be configured to perform heat exchange with a condenser and cooling of a compressor and then to be discharged to the indoor.

Further, in the plant cultivation apparatus of the present disclosure, air circulating in a cultivation room may pass through an evaporator positioned at a rear side in the cabinet and then may be supplied again into the cultivation room. Thus, the apparatus may have a closed-type structure capable of temperature control.

Further, in the plant cultivation apparatus of the present disclosure, the machine chamber may be provided in a lower portion of the cultivation room and be open forward. Thus, air discharged from the machine chamber may face a floor of the indoor, and user's discomfort due to the discharged air may be prevented in advance.

Further, in the plant cultivation apparatus of the present disclosure, an intake and exhaust grill may be provided in an open front surface of a machine chamber frame. Thus, a direction of the air discharged from the machine chamber may be guided by the intake and exhaust grill and the inside of the machine chamber may be prevented from being exposed outward.

Further, in the plant cultivation apparatus of the present disclosure, a partition may be provided in the machine chamber to divide an air inflow side and an air out flow side. Thus, the temperature control in the cultivation room may be smoothly performed as airflow may pass through the evaporator.

Further, in the plant cultivation apparatus of the present disclosure, a residual water detection sensor may be provided in the bottom in the cultivation room of the cabinet. Thus, a water level of supply water in the bed that is positioned to be seated on the bottom in the cultivation room may be accurately checked.

Further, in the plant cultivation apparatus of the present disclosure, the compressor and the condenser constituting the air conditioning module may be provided in the machine chamber of the machine chamber frame, and the evaporator may be provided at the rear side of the cultivation room in the cabinet. Thus, each component may be separately installed.

Further, in the plant cultivation apparatus of the present disclosure, the condenser may be provided in the air inflow side in the machine chamber. Thus, refrigerant may be smoothly condensed.

Further, in the plant cultivation apparatus of the present disclosure, the compressor may be provided in a portion among flow paths in the machine chamber where air passes through the condenser. Thus, high temperature air passing through the compressor may be prevented from affecting to the condenser.

Further, in the plant cultivation apparatus of the present disclosure, a lighting module may be provided on an upper surface of the cultivation room in the cabinet. Thus, enough light may be supplied to the plant cultivated in the cultivation room.

Further, in the plant cultivation apparatus of the present disclosure, the inside of the cabinet may be divided by the first lighting module into a first cultivation room and a second cultivation room. Thus, cultivation spaces may be maximally secured.

Further, in the plant cultivation apparatus of the present disclosure, the residual water detection sensor detecting residual water of a second bed may be provided in the first lighting module. Thus, a structure for detecting the residual water of the second bed may be simplified.

Further, in the plant cultivation apparatus of the present disclosure, a water supply module may be provided in the cabinet. Thus, water of the required amount may be supplied to the plant.

Further, in the plant cultivation apparatus of the present disclosure, the water supply module may include the water tank, the water pump, and an inlet hose. Thus, the supply water does not remain in the bed, but may be always supplied at the required amount periodically or aperiodically, so that green algae or odor may be prevented.

Further, in the plant cultivation apparatus of the present disclosure, the water tank may be positioned at a lower side in the cabinet. Thus, space utilization may be improved.

Further, in the plant cultivation apparatus of the present disclosure, the water tank may be provided to be taken out from the cabinet. Thus, the user can easily perform supplementing or washing in the water tank.

Further, in the plant cultivation apparatus of the present disclosure, the water tank may be formed in a container body having an open upper surface.

Further, in the plant cultivation apparatus of the present disclosure, the open upper surface of the water tank may be configured to be opened and closed by an opening and closing cover. Thus, washing of the water tank may be easily performed.

Further, in the plant cultivation apparatus of the present disclosure, the opening and closing cover may be provided with a water supply connection tube. Thus, the supply water stored in the water tank may be transferred to the water pump.

Further, in the plant cultivation apparatus of the present disclosure, the water supply connection tube may include an inlet tube may protruding from a lower surface of a rear side of the opening and closing cover to the bottom in the water tank. Thus, the supply water in the water tank may be maximally used.

Further, in the plant cultivation apparatus of the present disclosure, the water supply connection tube may include a connection tube extended toward a rear surface of an upper end of the inlet tube. Thus, connection and disconnection between the connection tube and the water pump may be performed by drawable operation to move the water tank back and forth.

Further, in the plant cultivation apparatus of the present disclosure, a door may be configured to block the water tank. Thus, after the door is opened, the water tank may be taken out.

Further, in the plant cultivation apparatus of the present disclosure, the water reservoir may be provided in a rear surface of the bed. Thus, when the bed is reinstalled in the cultivation room, the supply water supplied through the inlet hose may be supplied.

Advantageous Effects of Invention

As described above, the plant cultivation apparatus of the present disclosure may have various effects as follows.

The plant cultivation apparatus of the present disclosure may be configured to suction and discharge air through the front surface of the machine chamber in spite of the closed-type structure thereof. Accordingly, even when the plant cultivation apparatus is installed in a narrow place, for example, it may be installed in a narrow place in a built-in method, the air circulation can be smoothly performed.

The plant cultivation apparatus of the present disclosure may be configured such that the bed is provided as a forward drawable structure. Accordingly, even when the plant cultivation apparatus is installed in a narrow place, maintenance such as replacement of the pod or cleaning of the bed can be easily performed.

The plant cultivation apparatus of the present disclosure may be configured to separately supply water of a predetermined amount to a plant and additionally provide water when residual water does not remain in the bed, rather than uniformly providing supply water to a fixed level. Accordingly, the residual water due to excessive water supply can be prevented and contamination and odor of the residual water can be prevented.

The plant cultivation apparatus of the present disclosure may be configured as noncirculating structure in which the supplied water without containing a nutrient solution is normally stored in the separate water tank, which is blocked from the outside environment, and is supplied to the bed when necessary. Accordingly, contamination of the supply water can be prevented.

The plant cultivation apparatus of the present disclosure may adopt the structure in which air circulation may be performed for each cultivation room in the cabinet. Accordingly, the temperature control for plant cultivation can be performed for each cultivation room, so various types of plants can be cultivated at the same time.

The plant cultivation apparatus of the present disclosure may be configured for easy removal of the water tank. Accordingly, supplementing or washing of the water tank can be easily performed.

The plant cultivation apparatus of the present disclosure may be configured to allow air circulating in the cultivation room to pass through the surface of the door and flow downward and be discharged from the machine chamber. Accordingly, moisture produced on the surface of the door can be removed and internal observation of the inside of the plant cultivation apparatus can be easily performed.

The plant cultivation apparatus of the present disclosure may be configured to have the supply water groove in the bed. In particular, the supply water groove may be configured as a track-shaped structure in which the dam part is provided in the inner portion thereof. Accordingly, the residual water can be minimized and the plurality of pods can absorb the supply water at the same time.

BRIEF DESCRIPTION OF DRAWINGS

FIG. 2 is a perspective view showing the exterior of the plant cultivation apparatus according to the embodiment of the present disclosure, the plant cultivation apparatus in a state in which a door of the plant cultivation apparatus is closed;

FIG. 3 is a perspective view showing the exterior of the plant cultivation apparatus according to the embodiment of the present disclosure, the plant cultivation apparatus in a state in which the door thereof is opened;

FIG. 4 is a front section view showing a pod of the plant cultivation apparatus according to the embodiment of the present disclosure;

FIG. 5 is a side section view showing the pot of the plant cultivation apparatus according to the embodiment of the present disclosure;

FIG. 6 is a side section view showing the plant cultivation apparatus according to the embodiment of the present disclosure;

FIG. 7 is a sectioned-perspective view showing an internal structure of the plant cultivation apparatus according to the embodiment of the present disclosure;

FIG. 8 is a perspective view showing an internal structure of a machine chamber of the plant cultivation apparatus according to the embodiment of the present disclosure;

FIG. 9 is a plan view showing the internal structure of the machine chamber of the plant cultivation apparatus according to the embodiment of the present disclosure;

FIG. 10 is a perspective view showing a bed of the plant cultivation apparatus according to the embodiment of the present disclosure;

FIG. 11 is a perspective view showing the bed of the plant cultivation apparatus according to the embodiment of the present disclosure, the view being taken from another direction;

FIG. 12 is a plan view showing the bed of the plant cultivation apparatus according to the embodiment of the present disclosure;

FIG. 13 is a sectioned-perspective view showing the bed of the plant cultivation apparatus according to the embodiment of the present disclosure;

FIG. 14 is a side section view showing the bed of the plant cultivation apparatus according to the embodiment of the present disclosure;

FIG. 15 is a sectioned-perspective view showing a coupled state between the bed, a bed cover, and the pod of the plant cultivation apparatus according to the embodiment of the present disclosure;

FIG. 16 is a main-part section view showing an installation state of the bed of the plant cultivation apparatus according to the embodiment of the present disclosure;

FIG. 17 is an enlarged view of part "A" in FIG. 7;

FIG. 18 is a perspective view showing a lighting module of the plant cultivation apparatus according to the embodiment of the present disclosure, the view being taken from an upper side of the plant cultivation apparatus;

FIG. 19 is a perspective view partially showing a section of the lighting module of the plant cultivation apparatus according to the embodiment of the present disclosure;

FIG. 20 is a perspective view showing the lighting module of the plant cultivation apparatus according to the embodiment of the present disclosure, the view being taken from a lower side of the plant cultivation apparatus;

FIG. 21 is a section view showing the lighting module of the plant cultivation apparatus according to the embodiment of the present disclosure;

FIG. 22 is an enlarged view of part "B" in FIG. 7, the view showing a circulation fan assembly of the plant cultivation apparatus according to the embodiment of the present disclosure;

FIG. 23 is a side view showing a state in which an opening and closing cover of a water supply module of the plant cultivation apparatus according to the embodiment of the present disclosure is opened;

FIG. 24 is a perspective view showing a state in which a water tank of the water supply module of the plant cultivation apparatus according to the embodiment of the present disclosure is coupled to an installation frame;

FIG. 25 is a section view showing a state in which the water tank of the water supply module of the plant cultivation apparatus according to the embodiment of the present disclosure is coupled to the installation frame;

FIG. 26 is a rear view showing a state in which a water pump is coupled to the installation frame of the water supply module of the plant cultivation apparatus according to the embodiment of the present disclosure;

FIG. 27 is a plan view showing airflow flowing into the machine chamber of the plant cultivation apparatus according to the embodiment of the present disclosure;

FIG. 28 is a plan view showing a water supply state flowing into the bed of the plant cultivation apparatus according to the embodiment of the present disclosure; and FIG. 29 is a section view showing airflow flowing from the machine chamber to a cultivation room of the plant cultivation apparatus according to the embodiment of the present disclosure.

MODE FOR THE INVENTION

Figure 1:
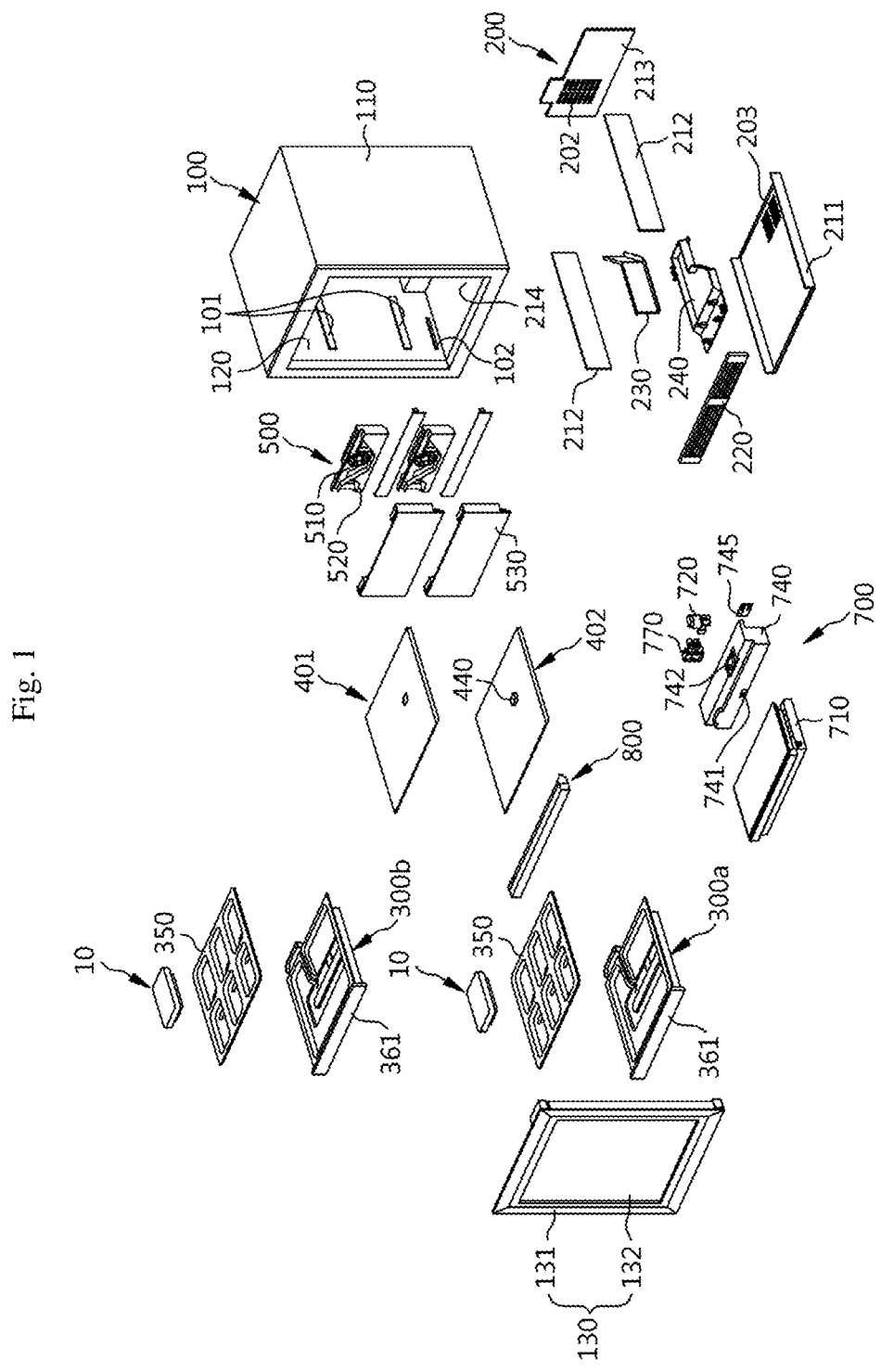
FIG. 1 is an exploded-perspective view showing a plant cultivation apparatus according to an embodiment of the present disclosure.

Hereinbelow, an exemplary embodiment of a plant cultivation apparatus of the present disclosure will be described with reference to FIGS. 1 to 29.

FIG. 1 is an exploded-perspective view showing the plant cultivation apparatus according to the embodiment of the present disclosure. FIG. 2 is a perspective view showing the plant cultivation apparatus according to the embodiment of the present disclosure. FIG. 3 is a perspective view showing the plant cultivation apparatus according to the embodiment of the present disclosure, the plant cultivation apparatus in a state in which the door thereof is opened.

As described in the drawings, the plant cultivation apparatus according to the embodiment of the present disclosure includes: a cabinet 100; a machine chamber frame 200, a bed 300a, 300b on which a pod 10 is seated; a lighting module 401, 402; a circulation fan assembly 500; an air conditioning module 600; and a water supply module 700. In particular, the pod 10 seated on the bed 300a, 300b may include bed soil 11 containing a nutrient solution so that supply water stored in the water supply module 700 may be prevented from being deteriorated by the nutrient solution and the supply water of the required amount may always supplied to the bed 300a, 300b. Thus, the supply water may be prevented from remaining in the bed 300a, 300b.

The plant cultivation apparatus will be described for each configuration.

The pod 10 will be described with reference to FIGS. 4 and 5.

The pod 10 may be formed in an upward open container.

The bed soil 11 containing the nutrient solution (not shown) may be filled in the pod 10.

The nutrient solution may be a material containing a nutrient that is supplied to a plant to grow better. The nutrient solution may be provided in a water-soluble capsule form that gradually dissolves in water, so that the nutrient solution may be contained in the supply water while gradually dissolving every time when the supply water is supplied.

In addition, a seed paper 12 may be provided on an upper surface of the bed soil 11. The seed paper 12 may be a part where seeds are planted in a predetermined arrangement, and when the supply water is supplied while the seed paper 12 is seated on the upper surface of the bed soil 11, the seed paper 12 may completely dissolve and the seeds may remain on the bed soil 11.

A brick 13 may be provided on an upper surface of the seed paper 12.

The brick 13 may be configured to control moisture and humidity of soil and to prevent mold growth, and be formed by processing mineral ore such as vermiculite into a powder form and then compresses.

An upper surface of the pod 10 may be covered with a protection sheet 15, thereby protecting the inside thereof.

In particular, a packing member 14 may be provided between an upper surface of the brick 13 and the protection sheet 15, so that the brick 13 may be protected from the outside environment.

A type of a plant to be cultivated may be printed on a surface of the protection sheet 15.

Meanwhile, a protrusion 16 may be formed downward on a lower surface of the pod 10 and the protrusion 16 may be formed in a container body in which a water flow hole 16a may be provided at an lower surface thereof. The protrusion 16 may be formed in a hollow pipe structure that is open vertically and empty inside.

Further, a first absorber member 17 absorbing the supply water supplied to the bed 300a, 300b may be provided in the protrusion 16, and a flat plate shaped second absorber member 18 may be provided between the first absorber member 17 and the bed soil. The second absorber member 18 may serve to uniformly supply the supply water absorbed by the first absorber member 17 to the entire portion of the bed soil 11.

Next, the cabinet 100 will be described with reference to FIGS. 1 to 3.

The cabinet 100 may be a part that forms the exterior of the plant cultivation apparatus.

The cabinet 100 may be formed in a container body that is open frontward, and include an outer case 110 providing an outer wall surface thereof and an inner case 120 providing an inner wall surface.

Herein, the outer case 110 may be formed in a container body shape that is closed at an upper surface, and a lower surface and a front surface are open.

The inner case 120 may be positioned in the outer case 110 while being spaced apart from the outer case 110. A foam insulation (not shown) may be filled between the inner case 120 and the outer case 110.

The cultivation room 121, 122 may be provided in the inner case 120. The cultivation room 121, 122 may be a place where the plant are grown.

The cultivation room 121, 122 may include a lower first cultivation room 121 at a lower side of the inner case and an upper second cultivation room 122 at an upper side thereof. The two cultivation rooms 121 and 122 may be configured to have separate spaces, respectively.

The inner case 120 may have a bottom 123. The bottom 123 of the inner case 120 may be provided as a bottom of the cultivation room 121, 122 in the cabinet 100.

The cabinet 100 may have a door 130 at a front surface thereof.

The door 130 may be configured to open and close the cultivation room 121, 122 of the cabinet 100.

That is, as the door 130 is provided in the cabinet 100, the plant cultivation apparatus according to the embodiment of the present disclosure may be a closed-type cultivation apparatus. In particular, in the case of the closed-type cultivation apparatus, the plant cultivation apparatus may cultivate the plant while providing a sufficient amount of light and maintaining a predetermined temperature therein by the lighting module 401, 402, the circulation fan assembly 500, and the air conditioning module 600, which will be described below.

Meanwhile, the door 130 may be one of a rotary type opening and closing structure and a sliding type opening and closing structure. Further, the door 130 may be configured to block the front surface of the cabinet 100.

In the embodiment of the present disclosure, the door 130 is configured as the rotary type opening and closing structure.

The door 130 may include a door frame 131 having a rectangular frame structure with an empty inside portion and a sight glass 132 blocking the empty inside portion of the door frame 131.

Preferably, the sight glass 132 may be formed of a transparent material, for example, may be formed of glass.

When the sight glass 132 is formed of glass, a protecting film (not shown) may be attached on the glass. The protecting film may be a light shading film (partially shading) that minimizes the leakage of light from the cultivation room indoors.

Instead of the protecting film, the sight glass 132 may have a dark color, so that the leakage of light indoors may be minimized.

Although not shown in the drawings, the door 130 may be configured of only the sight glass 132 without the door frame 131, and may be configured as a structure without the sight glass 132.

Next, the machine chamber frame 200 will be described with reference to FIGS. 1 and 6 to 9.

The machine chamber frame 200 may constitute a bottom portion of the plant cultivation apparatus according to the embodiment of the present disclosure.

The machine chamber frame 200 may be extended from a lower portion of the outer case 110, as shown in FIG. 1. The machine chamber frame 200 may include a bottom plate 211 constituting a bottom of the machine chamber frame 200, side surface plates 212 constituting opposite side surfaces thereof, a rear surface plate 213 constituting a rear surface thereof, and an upper surface plate 214 constituting an upper surface thereof. That is, the machine chamber frame 200 may be formed in a box shaped structure that has an open front surface.

The machine chamber frame 200 may be configured such that an open lower surface of the outer case 110 is placed thereon and is coupled thereto.

The machine chamber frame 200 and the inner case 120 may be disposed to be spaced apart from each other and the side surface plates 212 and the rear surface plate 213 of the machine chamber frame 200 may be respectively configured to be connected to opposite side surfaces and a rear surface of the outer case 110.

The machine chamber frame 200 may be provided with a machine chamber 201 (referring to FIG. 6).

That is, the machine chamber 201 and the cultivation rooms 121 and 122 may be respectively formed in the inner case 120 and in the machine chamber frame 200, and perform separate functions from each other.

A part of components of the air conditioning module 600, which will be described below, may be provided in the machine chamber 201.

Although not shown in the drawings, the inner case 120 and the machine chamber frame 200 may be formed in a singly body. In this case, a separate partition may be provided between the cultivation room 121, 122 and the machine chamber 201 so that the cultivation room 121, 122 and the machine chamber 201 may be separated from each other.

Further, an intake and exhaust grill 220 may be provided on the open front surface of the machine chamber frame 200 that is the front of the machine chamber 201. That is, the intake and exhaust grill 220 may serve to guide airflow suctioned from the indoor into the machine chamber 201 or airflow discharged from the machine chamber 201 to the indoor and to block the open front surface of the machine chamber 201.

In addition, the intake and exhaust grill 220 may have an inlet 221 and an outlet 222. The inlet 221 and the outlet 222 may be separated from each other by being arranged at positions divided by a partition 230. In the embodiment of the present disclosure, the inlet 221 and the outlet 222 may be distinguished as the inlet 221 at the left and the outlet 222 at the right, when viewed from the front of the plant cultivation apparatus. This is as shown in FIGS. 2 and 3.

Further, the partition 230 dividing the inside of the machine chamber 201 into left and right sides may be provided in the machine chamber frame 200. That is, flow paths through which air flows into and is discharged from the machine chamber 201 may be divided by the partition 230.

A flow path through which air flows into the machine chamber 201 is positioned in the inlet 221 of the intake and exhaust grill 220, and a flow path through which air is discharged from the machine chamber 201 is positioned in the outlet 222 thereof.

In addition, the opposite sides in the machine chamber 201 which are divided by the partition 230 may be configured to communicate with each other at a rear portion of the machine chamber 201. That is, a rear end portion of the partition 230 may be spaced apart from a rear wall surface in the machine chamber 201, not to be in contact therewith, so that the opposite sides divided from each other may communicate with each other.

Although not shown in the drawings, an open hole (not shown) may be provided in the rear end portion of the partition 230 to allow the opposite sides in the machine chamber 201 to communicate with each other.

Further, the partition 230 may be formed in a straight line shape, and may be formed in an inclined structure or a bent structure. In the embodiment of the present disclosure, the partition 230 is formed in the bent structure. That is, the partition 230 is partially bent, so that a condenser 620, which will be described later, may be formed as large as possible.

Further, a condensed water reservoir 240 may be provided in the machine chamber 201 of the machine chamber frame 200. The condensed water reservoir 240 that is described above may be positioned at a bottom at the side where air flows into the machine chamber 201 through the inlet 221, and may server to receive condensed water flowing down from the condenser 620 and to fix the condenser 620 in the machine chamber.

Further, a heat exhaust opening 202 may be formed by penetrating the rear surface plate 213 of the machine chamber frame 200. The heat exhaust opening 202 may be a hole provided to discharge (or suction) air dissipating heat of the compressor 610, which will be described below. That is, the heat exhaust opening 202 is additionally provided, so that the discharge of air may be smoothly performed.

The bottom plate 211 of the machine chamber frame 200 may have a discharge hole 203 that is provided to discharge the air dissipating heat of the compressor 610.

Meanwhile, a rear portion of the upper surface plate 214 providing the machine chamber frame 200 may protrude upward more than other portions thereof, so that the rear portion of the inside of the machine chamber 201 may be higher than other portions thereof. That is, considering a protruding height of the compressor 610 provided in the machine chamber 201, the rear portion of the machine chamber 201 may be formed higher than the other portions thereof.

Further, a controller 20 (referring to FIG. 6) may be provided at a front portion between an upper surface of the upper surface plate 214 and a lower surface of the inner case 120, the lower surface thereof facing the upper surface of the upper surface plate 214, the controller 20 being provided to control operation with respect to each component of the plant cultivation apparatus. A circuit board having various control circuits may constitute the controller 20.

Next, the bed 300a, 300b will be described with reference to FIGS. 10 to 17.

The bed 300a, 300b may be a part provided to place the pod 10 thereon.

The bed 300a, 300b may be formed in a tray structure having a flat plate shape or a circumference wall, and the bed 300a, 300b may be configured to store supply water on an upper surface thereof.

In particular, first guide rails 101 (referring to FIGS. 1 and 16) may be respectively provided on opposite wall surfaces (opposite wall surfaces in the inner case) in the cultivation room 121, 122. The first guide rails 101 may guide the bed 300a, 300b to be moved back and forth so that the bed 300a, 300b may be taken out from the cultivation room 121, 122 in a drawer manner.

Guide ends 301 may be provided on opposite wall surfaces of the bed 300a, 300b. The guide ends 301 may be configured to be supported by the first guide rails 101, so that the bed 300a, 300b may be taken out from the cultivation room 121, 122 in the drawer manner. Through other various structures not shown, the bed 300a, 300b may be taken out from the cultivation room 121, 122 in the drawer manner.

Further, a water reservoir 310 may be provided in a rear surface of the bed 300a, 300b. The water reservoir 310 may be a part receiving the supply water from the outside of the bed 300a, 300b and providing the supply water into the bed 300a, 300b.

The water reservoir 310 may protrude rearward from either side portion of the rear surface of the bed 300a, 300b. In addition, a bottom surface of the water reservoir 310 may be depressed downward thereby guiding the supply water to flow into a communicating portion with a supply water flow path 330, which will be described below.

In addition, at a center portion in the bed 300a, 300b, a supply water groove 320 that is depressed from a bottom in the bed 300a, 300b is provided. Thereby, the supply water supplied to the water reservoir 310 is guided by the supply water flow path 330 to be supplied to the supply water groove 320.

The supply water flow path 330 is formed in a groove extended from the water reservoir 310 to the supply water groove 320. Although not shown in the drawings, the supply water flow path 330 may be a separate pipe or hose from the bed 300a, 300b.

In particular, the supply water flow path 330 may be formed in an inclined or round structure, the structure being gradually inclined downward as supply water flow path 330 goes from the water reservoir 310 to the supply water groove 320. That is, by the above-described inclined or round structure, the supply of the supply water may be performed quickly and the supply water supplied to the supply water groove 320 may be prevented from flowing back to the water reservoir 310.

In addition, bank parts 331 may be provided at opposite sides of the supply water flow path 330, the bank parts 331 being provided to precisely guide the supply water. That is, by the bank parts 331, the supply water supplied along the supply water flow path 330 may be smoothly supplied to the supply water groove 320 without deviating from the supply water flow path 330.

Further, a dam part 340 may be formed on a center portion in the supply water groove 320, the dam part 340 protruding upward from a surface of the supply water groove 320. The dam part 340 may be formed in a long protrusion that is long in a left and right direction of the bed 300a, 300b. Based on the dam part 340, the supply water groove 320 may be divided into a front water supply groove 321 and a rear water supply groove 322.

That is, when a plurality of pods 10 are seated in rows of the front and rear of the bed 300a, 300b, pods 10 at the front row are arranged to be in contact with the front water supply groove 321 while the protrusion 16 of each of the front pods is positioned rearward, and pods 10 at the rear row are arranged to be in contact with the rear water supply groove 322 while the protrusion 16 of each of the rear pods is positioned forward.

In particular, the dam part 340 may protrude from a bottom in the supply water groove 320, thus the supply water does not remain. Further, the dam part 340 may serve to guide the supply water to be supplied to only a portion where the protrusion 16 of the pod 10 is positioned.

Further, a flow guidance groove 302 may be provided in a portion of the bottom surface in the supply water groove 320, the portion communicating with the supply water flow path 330.

That is, the supply water flowing along the supply water flow path 330 may be guided by the flow guidance groove 302 in the process of flowing into the supply water groove 320 to flow from one side of the supply water groove 320 to another side thereof.

In addition, a sensing protrusion 323 may protrude from the bottom surface in the supply water groove 320. An upper surface of the sensing protrusion 323 may be positioned higher than the bottom surface of the supply water groove 320 and may be positioned lower than the bottom surface of the bed 300a, 300b.

Meanwhile, a plurality of beds 300a and 300b may be provided. In this case, the beds 300a and 300b may be respectively provided in the cultivation rooms 121 and 122 while being vertically spaced apart from each other.

A vertical distance between the beds 300a and 300b may be set differently in response to sizes in the cultivation rooms 121 and 122 or the type of plant to be cultivated. For example, as the first guide rails 101 that are provided on the opposite wall surfaces in the cultivation room 121, 122 are configured to be adjusted in vertical position, the vertical distance between the beds 300a and 300b may be adjusted as needed.

The bed 300a, 300b may have a bed cover 350.

The bed cover 350 may be a part where the pod 10 is seated at a precise position thereof. An upper surface of the bed cover 350 has a plurality of seating grooves 351 and 352 for the seating of each of the pods 10.

Each of the seating grooves 351 and 352 may have a width roughly equal to a width of the pod 10 and be depressed at a depth sufficient to partially receive the pod 10 therein. The bed cover 350 may be formed of a metal material, and in particular, it is preferable that the bed cover 350 is formed of stainless steel to prevent corrosion. The bed 300a, 300b may be formed of acrylonitrile, butadiene, styrene (ABS) resin.

In addition, the penetration hole 351a, 352a may be provided in the seating groove 351, 352 to allow the protrusion 16 of the pod 10 to penetrate the seating groove 351, 352. That is, a user can place the pod 10 at the precise position thereof by checking positions of the penetration hole 351a, 352a and the protrusion 16.

In particular, the seating grooves 351 and 352 may be divided into a front row seating groove 351 on which each of the pods 10 at the front row is seated and a rear row seating groove 352 on which each of the pods 10 at the rear row is seated. A penetration hole 351a of the front row seating groove 351 and a penetration hole 352a of the rear row seating groove 352 may be arranged adjacent to each other. That is, when the bed cover 350 is seated on the bed 300a, 300b, the penetration holes 351a and 352a may be respectively positioned at the front water supply groove 321 and the rear water supply groove 322 of the bed 300a, 300b.

Further, a handle 361 may be provided in a front surface of the bed 300a, 300b. The user can take out or reinstall the bed 300a, 300b in the drawer manner by using the handle 361.

The handle 361 may be configured such that a front surface thereof is not in contact with an inside surface of the door 130, thus a gap may be provided between the front surface of the handle 361 and the door 130. That is, through the gap, air may flow between a lower cultivation room 121 and an upper cultivation room 122, and air flowing through the lower cultivation room 122 may be discharged outward of the plant cultivation apparatus through the gap.

Through the flow of air passing through the gap, a surface of the door 130 may be prevented from condensation.

Next, the lighting module 401, 402 will be described with reference to FIGS. 18 to 21.

The lighting module 401, 402 may be a part emitting light to the pod 10 seated on the bed 300a, 300b in the cultivation room 121, 122. That is, as the lighting module 401, 402 is provided in the plant cultivation apparatus, the plant cultivation apparatus may continue to provide light to the plant, in spite of being the closed-type cultivation apparatus.

In the embodiment, the lighting module 401, 402 may be a light emitting diode (LED) 421 and be configured to emit light.

To this end, the lighting module 401, 402 may include a lighting case 410 constituting an outside appearance of the lighting module 401, 402, a circuit board 420 in which the LED 421 is embedded, and the lighting cover 430 covering the lighting case 410.

The lighting case 410 may be a part where the circuit board 420 is provided.

In addition, the lighting case 410 may have a plurality of lighting holes 411.

The circuit board 420 may be provided by being fixed to an upper surface of the lighting case 410.

The LED 421 embedded in the circuit board 420 may be arranged to emit light through the lighting holes 411 of the lighting case 410.

Further, the lighting cover 430 may be coupled to the lighting case to block a lower surface of the lighting case 410. The lighting cover 430 may protect the circuit board 420 from moisture in the cultivation room 121, 122.

It is preferable that the surface of the lighting cover 430 is coated or surface-processed for the diffusion of light. Thus, light emitted from the LED 421 may be uniformly dispersed to the entire portion in the cultivation room 121, 122 without being focused on one portion.

In addition, the upper surface of the lighting case 410 may have an upper cover 460.

Meanwhile, the cultivation room 121, 122 in the cabinet 100 may be divided into the lower first cultivation room 121 and the upper second cultivation room 122.

In this case, the bed 300a, 300b may include a first bed 300a provided in the first cultivation room 121 and a second bed 300b provided in the second cultivation room 122.

In addition, the lighting module 401, 402 may include a first lighting module 401 provided in the first cultivation room 121 and a second lighting module 402 provided in the second cultivation room 122.

The first bed 300a may be positioned at the bottom in the cabinet 100, and the first lighting module 401 may be positioned above the first bed 300a.

Further, the second bed 300b may be positioned on an upper surface of the first lighting module 401, and the second lighting module 402 may be positioned at a ceiling in the cabinet 100 that is an upper side of the second bed 300b.

As described above, the first lighting module 401 may serve as a partition wall vertically dividing the inside of the cabinet into the two cultivation rooms 121 and 122. Accordingly, since there is no need to provide a separate partition wall, sizes of each of the cultivation rooms 121 and 122 may be maximally secured.

The first lighting module 401 may be configured such that, a rear end thereof is fixed by a shroud 520 of the circulation fan assembly 500, which will be described below.

Further, a second residual water detection sensor 440 may be provided on the upper surface of the first lighting module 401. The second residual water detection sensor 440 may serve to detect residual water in the supply water groove 320 of the second bed 300b.

The second residual water detection sensor 440 may be provided on an upper surface of the second lighting module 402. That is, as the first lighting module 401 and the second lighting module 402 are formed in the same shape, the second residual water detection sensor 440 may be used in both the first and second lighting modules. In the case of the second lighting module 402, the second lighting module 402 may have only a portion that may be coupled with the second residual water detection sensor 440, but may be not equipped with the second residual water detection sensor 440.

In particular, the second residual water detection sensor 440 may be positioned in the inside of the sensing protrusion 323 of a lower portion of the second bed 300b, and may detect whether or not the residual water remains on the upper surface of the sensing protrusion 323 to determine the residual water in the supply water groove 320.

The second residual water detection sensor 440 may be configured of a capacitance-type sensor and accurately detect the residual water in the supply water groove 320.

The second residual water detection sensor 440 may also be configured in other methods not shown in the drawings. For example, the second residual water detection sensor 440 may be configured as a mechanical sensor such as a floating method or an electronic sensor using two electrodes.

The upper surface of the first lighting module 401 may have a temperature sensor 450. The temperature sensor 450 may serve to detect the temperature in the cultivation room 121, 122 and allow the air temperature to be controlled by the air conditioning module 600.

Next, the circulation fan assembly 500 will be described with reference to FIGS. 1, 6 to 7, and 22.

The circulation fan assembly 500 may be provided to circulate air in the cultivation room 121, 122.

The circulation fan assembly 500 may be provided in the front of a rear wall constituting the inner case 120. The circulation fan assembly 500 may be configured to suction air from a lower side in each cultivation room 121, 122 and then to discharge the air to an upper side in the cultivation room 121, 122. The lower and upper sides in the cultivation room 121, 122 may be defined by a middle height of the cultivation room 121, 122.

Meanwhile, the circulation fan assembly 500 may be provided for each of the cultivation rooms 121 and 122, or the single circulation fan assembly 500 may be configured to control air circulation to all the cultivation rooms 121 and 122.

In the embodiment of the present disclosure, the circulation fan assembly 500 may be provided for each of the cultivation rooms 121 and 122. That is, the air circulations in the cultivation rooms 121 and 122 may be performed equally or separately by the circulation fans assemblies 500, respectively.

When the air circulation may be controlled separately for each of the cultivation rooms 121 and 122, plants that require different types of cultivation environments may be simultaneously cultivated in the cultivation rooms 121 and 122.

The circulation fan assembly 500 may include circulation fans 510, the shroud 520, and a partition wall 530.

The circulation fans 510 may be fans driven to blow air. The circulation fans 510 may be radial flow fans that suction air in a shaft direction thereof and blows the air in a radial direction.

Further, the shroud 520 may be a part guiding a flow of air blown by the circulation fans 510 as the circulation fans 510 is provided in the cultivation room.

The shroud 520 may have an installation hole 521 formed by penetrating the shroud 520, the installation hole being provided to receive the circulation fans 510. The shroud 520 may have an air guide 522 at a front surface thereof, the air guide 522 guiding air suctioned through the circulation fans 510 from a rear side in the cabinet 100 (a gap between the shroud and the rear wall surface in the inner case) to flow into the cultivation room 121, 122. The air guide 522 may be configured to guide air blown in the radial direction of the circulation fans 510 to flow to the upper side in the cultivation room 121, 122.

Further, the partition wall 530 may be a part that is positioned at the front of the shroud 520 and blocks the shroud 520 from the cultivation room 121, 122.

That is, the partition wall 530 may protect the circulation fans 510 from the inside of the cultivation room 121, 122.

A lower portion of the partition wall 530 may be open to the inside of the cultivation room 121, 122. Thus, air flowing in the cultivation room 121, 122 may flow through the open lower portion of the partition wall 530 toward the side where the rear wall surface in the inner case 120 is positioned and then may heat-exchange with an evaporator 630. Continuously, the air may repeat the circulation of being supplied to the upper side in the cultivation room 121, 122 by blowing force of the circulation fans 510 and flow guidance of the shroud 520.

In particular, opposite side surfaces of the partition wall 530 may be fixed to the opposite wall surfaces or the rear wall surface in the inner case 120. The shroud 520 may be provided on the partition wall 530.

Next, the air conditioning module 600 will be described with reference to FIGS. 7 to 9.

The air conditioning module 600 may be provided to control the temperature in the cultivation room 121, 122 of the inner case 120.

The air conditioning module 600 may be an air conditioning device including the compressor 610, the condenser 620, and the evaporator 630. That is, the temperature control of the air circulating in the cultivation room 121, 122 may be performed by the air conditioning device.

The compressor 610 and the condenser 620 may be provided in the machine chamber 201 in the machine chamber frame 200.

The condenser 620 may be positioned at the air inflow side of the opposite sides divided by the partition 230 in the machine chamber frame 200. The compressor 610 may be positioned at a portion where air passing through the condenser 620 passes. In particular, the compressor 610 may be positioned at the air outflow side.

The above structure may be configured to allow the air flowing into the machine chamber 201 of the machine chamber frame 200 to pass through the condenser 620 by priority. That is, considering that the compressor 610 is configured to generate a great quantity of heat, when the air conditioning module is configured such that air passes through the compressor 610 and then heat-exchanges with the condenser 620, heat exchange efficiency may be reduced. Accordingly, it is preferable that the air conditioning module is configured such that air passes through the condenser 620 before the compressor 610.

In addition, the condenser 620 may be positioned at the front side in the machine chamber 201 (the side adjacent to the open front surface), and the compressor 610 may be positioned at the rear side in the machine chamber 201 (the side adjacent to the rear surface plate).

The structure may be configured to maximally divide positions of the compressor 610 and the condenser 620 and separate the compressor 610 from the condenser 620, so that the effect of the high temperature heat of the compressor 610 to the condenser 620 may be reduced.

Cooling fans 611 may be provided in the air inflow side of the compressor 610, so that air may flow into and be discharged from the machine chamber 201 and radiate heat of the compressor 610. The cooling fans 611 may serve to block a portion where the compressor 610 is positioned from the air inflow side where the condenser 620 is positioned. Therefore, effect of high temperature heat of the compressor 610 on the condenser 620 may be reduced.

Further, the evaporator 630 may be arranged in a rear portion of the circulation fan assembly 500 of each portion in the inner case 120. That is, by the operation F of the circulation fan assembly 500, during the circulated operation in which air is suctioned from the lower side in the cultivation room and the air is discharged to the upper side in the cultivation room 121, 122, the air may perform heat-exchange while passing through the evaporator 630.

The evaporator 630 may be a plate shaped evaporator. The evaporator 630 may be stably provided at the front of the rear wall surface in the inner case 120 and may be configured to improve heat exchange performance in a narrow place.

Meanwhile, the air conditioning module 600 may have an electric heater. That is, when a plant that lives in a higher temperature environment than the normal indoor environment is cultivated, the electric heater may be used to cultivate the plant.

Next, the water supply module 700 will be described with reference to FIGS. 23 to 26.

The water supply module 700 may be provided to supply the supply water to the bed 300 (300*a*, 300*b*).

In the embodiment of the present disclosure, the water supply module 700 that stores the supply water in advance may pump enough supply water to the bed 300 when the water supply is needed.

That is, in the conventional cultivation apparatus, the method of supplying the supply water of the required amount is not used, but a method of storing enough supply water in a water storage and supplying the stored supply water to soil by using an absorbing member is used. Herein, the supply water is mixed with a nutrient solution, so that a problem with contamination of the supply water may occur.

However, in the embodiment of the present disclosure, a nutrient solution material may be contained in the bed soil 11 of the pod 10. The supply water of the required amount may be supplied to the pod to prevent residual water from existing in portions other than a water tank 710, so that odor due to contamination of the supply water may be fundamentally prevented.

The water supply module 700 may include the water tank 710, a water pump 720, and an inlet hose 731, 732.

The water tank 710 may be a part in which the supply water is stored.

The water tank 710 may be formed in a rectangular box structure with an open upper portion, and be positioned between the bottom 123 of the inner case 120 and the first bed 300*a*. That is, considering that a gap may be provided between the bottom 123 of the inner case 120 and the first bed 300*a* because the upper surface plate 214 of the machine chamber frame 200 partially protrudes upward due to the height of the compressor 610 in the machine chamber 201, the water tank 710 may be positioned in the gap so that the cultivation room 121, 122 may be formed to be large enough.

In particular, the water tank 710 may be positioned at the front in the cabinet 100 and be provided to be drawable from the cabinet 100. That is, considering that the rear portion of the machine chamber 201 may be formed to be higher than the other portion due to the height of the compressor 610, the water tank 710 may be provided in a front portion of a lower portion in the inner case 120 provided due to the upward protruding portion of the machine chamber 201. On the opposite side wall surfaces of the cabinet 100, second guide rails 102 may be provided to guide back and forth movement of the water tank 710.

In addition, the water tank 710 may be configured to be exposed to the indoor when the door 130 is opened. That is, the door 130 may be configured to block not only the cultivation room 121, 122 but also the water tank 710, so that the water tank 710 may be exposed outward when the door 130 is opened. Thereby, the user can easily take out the water tank 710 to supply the supply water.

The water tank 710 may have a handle 711 at a front surface thereof, and the user can take out and reinstall the water tank 710 by using the handle 711 in a drawer manner.

In particular, the handle 711 of the water tank 710 may be also configured not to be in contact with the door 130 like the handle 361 of the bed 300. Thus, a gap may be provided between a front surface of the handle 711 and the door 130.

Next, the water pump 720 may be a part pumping the supply water in the water tank 710.

The water pump 720 may be positioned at the rear of the water tank 710.

In particular, an installation frame 740 may be provided between the water tank 710 and the water pump 720, and the water pump 720 may be fixed on a rear surface of the installation frame 740. That is, when the water tank 710 is taken out, the installation frame 740 may prevent the water pump 720 from being exposed outward and allow the water pump 720 to be fixed in a precise position thereof.

Further, a sensing part 741 detecting whether or not the water tank 710 is taken out may be provided on a front surface of the installation frame 740. The sensing part 741 may be configured of a proximity sensor, and when the water tank 710 is adjacent thereto, the sensing part may determine that the water tank 710 is mounted in the plant cultivation apparatus. The sensing part 741 may be configured of various detecting devices, such as a touch switch.

In addition, a first residual water detection sensor 742 may be provided at an upper surface of the installation frame 740. The first residual water detection sensor 742 may detect residual water remaining in the supply water groove 320 of the first bed 300*a* positioned above the installation frame 740.

In particular, the first residual water detection sensor 742 may be positioned at the inside of the sensing protrusion 323 in a lower portion of the first bed 300*a* and sense whether or not the residual water remains on the upper surface of the sensing protrusion 323, thereby determining the residual water in the supply water groove 320.

The first residual water detection sensor 742 may be configured of a capacitance-type sensor and accurately detect the residual water in the supply water groove 320.

The first residual water detection sensor 742 may be configured of other methods not shown in the drawings. For example, the first residual water detection sensor 742 may be configured as a mechanical sensor such as a floating method or an electronic sensor using two electrodes.

In addition, a third residual water detection sensor 743 may be provided on the front surface of the installation frame 740. The third residual water detection sensor 743 provided on the front surface of the installation frame 740 may serve to check whether or not the supply water remains in the water tank 710.

Next, the inlet hose 731, 732 may be a part supplying the supply water pumped by the water pump 720 to the bed 300a, 300b.

The inlet hose 731, 732 may be provided such that a first end thereof is connected to the water pump 720 and a second end thereof is positioned directly above the water reservoir 310 of the bed 300a, 300b.

The inlet hose 731, 732 may include a first inlet hose 731 supplying the supply water to the water reservoir 310 of the first bed 300a and a second inlet hose 732 supplying the supply water to the water reservoir 310 of the second bed 300b.

Meanwhile, an open upper surface of the water tank 710 constituting the water supply module 700 may be configured to be opened and closed by an opening and closing cover 750.

In addition, the opening and closing cover 750 may be provided with a water supply connection tube 760 connected to the water pump 720 so that the supply water stored in the water tank 710 may be transferred to the water pump 720. That is, the water pump 720 may be configured to be selectively connected to the water tank 710 by the water supply connection tube 760, not configuration of being directly connected to the water tank 710. Thus, only the water tank 710 may be taken out from the cabinet 100.

The water supply connection tube 760 may include an inlet tube 761 and a connection tube 762, the inlet tube 761 protruding from a lower surface of a rear side of the opening and closing cover 750 into the water tank 710, and the connection tube 762 being provided to be extended toward a rear surface of an upper end of the inlet tube 761 and connected to the water pump 720. That is, when the water tank 710 is reinstalled in the plant cultivation apparatus, as the connection tube 762 is connected to the water pump 720, the supply water in the water tank 710 may be pumped into the inlet hose 731, 732 by the pumping operation of the water pump 720. Further, when the water tank 710 is taken out from the plant cultivation apparatus, the connection tube 762 may be configured to be separated from the water pump 720.

In particular, the inlet tube 761 may protrude to the bottom in the water tank 710, thus it is preferable that the supplementing cycle of the supply water in the water tank 710 may be delayed as much as possible.

In addition, the water pump 720 and the two inlet hoses 731 and 732 may be connected to each other through a flow path valve 770. That is, by operation control of the flow path valve 770, the supply water pumped by the water pump 720 may be transferred to at least one of the inlet hoses 731 and 732.

Meanwhile, non-described reference numeral 745 may be a water level detection sensor detecting water level of the supply water in the water tank 710.

The plant cultivation apparatus according to the embodiment of the present disclosure may include a display module 800.

The display module 800 may be provided to display each condition of the plant cultivation apparatus and to perform various controls.

Each condition displaying by the display module 800 may be the temperature in the cultivation room 121, 122, cultivation time, operational states.

Further, the display module 800 may be configured to be operated in a touchable manner, or may be configured to be operated by a button or a switch.

In particular, the display module 800 may be provided in the cabinet 100 or in the door 130.

However, when the display module 800 is provided in the door 130, the connection structure of various signal lines or power lines may be inevitably complicated.

Considering that, the display module 800 may be preferably provided in the cabinet 100.

Moreover, considering that the sight glass 132 constituting the inside portion of the door 130 may be formed of a transparent material such as glass, the display module 800 may be preferably provided in the front of the first lighting module 401 among the lighting modules 401 and 402.

Hereinbelow, the operation of the plant cultivation apparatus according to the embodiment of the present disclosure will be described in detail for each process.

First, a preparation process of the pod 10 will be described.

When the pod 10 is newly provided in the plant cultivation apparatus, the user opens the door 130, and takes out the bed 300a, 300b positioned in the cultivation room 121, 122 while the cultivation room 121, 122 of the inner case 120 is opened.

The bed 300a, 300b may be slidingly moved along the first guide rails 101 and taken out from the cultivation room 121, 122 in the inner case 120. The bed 300a, 300b may be taken out only to the point where the pod 10 may be easily seated without discomfort without being completely removed.

In this state, the protection sheet 15 of the prepared pod 10 may be removed and then the pod 10 may be seated on the seating groove 351, 352 of the bed cover 350.

The pod 10 may be arranged such that the protrusion 16 provided in the lower surface thereof is positioned to match with the penetration hole 351a, 352a formed in the seating grooves 351 and 352. Thus, the pod 10 may be seated on the bed cover 350 in the state of being partially received in the seating groove 351, 352.

When the pod 10 where plant cultivation is completed is in the seating groove 351, 352 of the bed cover 350, the pod 10 with completed cultivation may be removed from the bed cover 350 and then a new pod 10 may be seated on the seating groove 351, 352.

When the seating of the pod 10 is completed, the user pushes the bed 300a, 300b to be inserted into the cultivation room 121, 122.

The above operation may be performed about at least one or all of the first bed 300a of the first cultivation room 121 and the second bed 300b of the second cultivation room 122 sequentially or selectively.

Next, the cultivation process will be described.

As described above, when the pod 10 is provided in the bed 300a, 300b in the cultivation room 121, 122, for germination of seeds planted in the pod 10 or for cultivation of germinated seeds in the pod 10, maintenance of temperature, provision of light, and supply of the supply water suitable for the germination and cultivation should be performed.

The above control may be performed with program set by default in the controller 20, and the user can set the control one by one.

In the embodiment of the present disclosure, the control may be automatically performed based on the program set by default. The program may vary in response to the type of plant or cultivation method.

The above-described control may be performed by manipulating the display module 800.

That is, when the cultivation operation is performed by manipulating the display module 800 in the state in which the bed 300a, 300b provided with the pod 10 is provided in the cultivation room 121, 122, the controller 20 may control the air conditioning module 600, the circulation fan assembly 500, the lighting module 401, 402, and the water supply module 700 to automatically cultivate the plant.

When the operation of the air conditioning module 600 is controlled, the air conditioning module including the compressor 610, the condenser 620, and the evaporator 630 and the cooling fans 611 may be operated to perform air conditioning operation.

In particular, when the air conditioning operation is performed, indoor air may be suctioned into the machine chamber through the inlet 221 of the intake and exhaust grill 220 provided on the open front surface of the machine chamber 201, and air that has passed through the machine chamber may be discharged through the outlet 222 of the intake and exhaust grill 220. The indoor air suctioned into the inlet 221 may perform heat exchange and heat radiation while passing through the condenser 620, the cooling fans 611, and the compressor 610 in order, and then be discharged to the indoor through the outlet 222. The above operation is as shown in FIG. 27.

In addition, when the air conditioning operation is performed, the circulation fans 510 constituting the circulation fan assembly 500 may be operated.

Accordingly, air flowing toward the rear wall surface in the inner case 120 may pass through the circulation fans 510 and be supplied into the cultivation room 121, 122. In addition, the air may flow in the cultivation room 121, 122 and then flow to the portion where the rear wall surface in the inner case 120 is positioned through the open lower end of the partition wall 530 positioned at the rear of the cultivation room 121, 122. Continuously, the air may perform heat exchange while passing through the evaporator 630 positioned at the portion and then repeat circulation of being supplied into the cultivation room 121, 122 by the blowing of the circulation fans 510 to control the temperature in the cultivation room 121, 122. The above operation is as shown in FIG. 29.

In particular, when air circulation in the cultivation room 121, 122 is repeated by the operation of the circulation fans 510, the air may pass through the evaporator 630 while flowing rearward of the cultivation room 121, 122 to perform heat exchange, and then may be supplied upward in the cultivation room 121, 122 through the circulation fan assembly 500.

Therefore, the air flowing into the cultivation room 121, 122 may be maintained at the predetermined temperature while flowing in the cultivation room 121, 122, thus the plant may be cultivated under the optimum temperature condition.

Meanwhile, a part of air circulated in the second cultivation room 122 may flow into the first cultivation room 121 while passing through the gap between the front surface of the second bed 300b and the door 130. A part of air circulated in the first cultivation room 121 may pass through the gap between the front surface of the first bed 300a and the door 130. Therefore, the surface of the door 130 may be prevented from condensation by flow of the air passing through each gap.

Further, when the cultivation operation is performed, the operation of the lighting module 401, 402 may be also controlled.

By the control of the operation of the lighting module 401, 402, the LED 421 may be periodically lit (or continuously lit) to supply lighting to the plant in the cultivation room 121, 122.

Even when the LED 421 emits light under the control of the lighting module 401, 402, light in the cultivation room 121, 122 may be transmitted to the indoor through the protecting film (or, dark colored tinted glass, not shown) of the sight glass 132 constituting the door 130, so that leakage of light and discomfort of the indoor user may be minimized.

In addition, when the cultivation operation is performed, the operation control of the water supply module 700 may be performed periodically (or when necessary).

That is, when the cultivated plant and the water supply cycle of the plant are determined, the operation control of the water pump 720 may be performed for each water supply cycle. When the operation of the water pump 720 is controlled and the sensing part 741 detects that the water tank 710 is not in place, the water pump 720 may be controlled not to be operated.

Whereas, when the sensing part 741 detects that the water tank 710 exists, the water pump 720 may be operated to supply the supply water stored in the water tank 710 to the bed 300a, 300b.

Then, the supply water may be pumped to the water pump 720 through the water supply connection tube 760, be selectively transferred to the inlet hose 731, 732 through the flow path valve 770, and then be supplied to the water reservoir 310 of the bed 300a, 300b.

The supply water supplied to the water reservoir 310 may be provided into the supply water groove 320 in the bed 300a, 300b while being guided by the supply water flow path 330 connected to the water reservoir 310. At this time, the bank parts 331 may protrude on the opposite sides of the supply water flow path 330, so that the supply water may smoothly flow into the supply water groove 320 along the supply water flow path 330.

In particular, the flow guidance groove 302 may be provided in the communication portion between the supply water flow path 330 and the supply water groove 320. Considering that the supply water groove 320 may be formed in a track shaped structure, the supply water flowing into any one portion in the supply water groove 320 by guidance of the supply water flow path 330 may flow from the one portion of the supply water groove 320 to another portion thereof by guidance of the flow guidance groove 302 to be filled in the front water supply groove 321 and the rear water supply groove 322 in order. The above description is as shown in FIG. 28.

Further, the supply water filled in the supply water groove 320 may be absorbed in the bed soil 11 of the pod 10 through the protrusion 16 of the pod 10, which is provided to be in contact with the supply water in the supply water groove 320, to be supplied to the plant.

Meanwhile, during the above-described water supply process, the residual water detection sensor 440, 742 may detect the water level of the supply water in the supply water groove 320.

That is, when the residual water detection sensor 440, 742 determines whether or not the supply water remains on the surface of the sensing protrusion 323 of the supply water groove 320 and detects the remaining of the supply water, the operation of the water pump 720 may be stopped to control the supply water not to be supplied.

The water supply method of using the residual water detection sensor 440, 742 may be intended to prevent the residual water in the bed 300a, 300b. That is, as the water supply is performed in a required amount, occurrence of residual water due to excessive water supply and contamination of the produced residual water may be prevented.

In particular, considering that increasing amount of the supply water is needed as the plant grows, the method according to the embodiment of the present disclosure may be configured such that, as absorbing of water increases by the plant, more water may be supplied to the bed, water may always be properly supplied even when the required amount of moisture changes as the plant grow.

As a result, the plant cultivation apparatus of the present disclosure may be configured to suction and discharge air through the front surface of the machine chamber 201 in spite of the closed-type structure thereof. Thus, even when the plant cultivation apparatus is provided in a narrow place in a built-in method, the air circulation may be smoothly performed.

Further, in the plant cultivation apparatus of the present disclosure, the bed 300a, 300b may be configured as the forward drawable manner. Thus, even when the plant cultivation apparatus is placed in the narrow place, maintenance such as replacement of the pod 10 or cleaning of the bed 300a, 300b may be easily performed.

Further, the plant cultivation apparatus of the present disclosure may be configured to always supply the proper amount of water to the plant. Thus occurrence of residual water due to excessive water supply may be prevented and thus contamination and odor of the residual water may be prevented.

Further, the plant cultivation apparatus of the present disclosure may be configured as the non-circulating structure in which the supplied water is normally stored in the separate water tank 710, which is blocked from the outside environment, and is supplied to the bed only when necessary. Thus, contamination of the supply water may be prevented.

Further, the plant cultivation apparatus of the present disclosure may adopt the structure in which air circulation may be performed for each cultivation room 121, 122. Thus, the temperature control for plant cultivation may be performed for each cultivation room 121, 122, so various types of plants may be cultivated at the same time.

Further, the plant cultivation apparatus of the present disclosure may be arranged and configured for easy removal of the water tank 710. Thus, supplementing or washing of the water tank 710 may be easily performed.

Further, the plant cultivation apparatus of the present disclosure may be configured to allow air circulating in the cultivation room 121, 122 to pass through the surface of the door 130 and flow downward and be discharged from the machine chamber 201. Thus, moisture produced on the surface of the door 130 may be removed and internal observation of the inside of the plant cultivation apparatus may be easily performed.

Further, the plant cultivation apparatus of the present disclosure may be configured to have the supply water groove 320 in the bed 300a, 300b, and in particular, the supply water groove 320 may be configured as the track-shaped structure in which the dam part 340 is provided in the inner portion thereof. Thus the residual water may be minimized and the plurality of pods 10 may absorb the supply water at the same time.

Further, the plant cultivation apparatus of the present disclosure may be configured such that the inside of the cabinet 100 may be divided into the lower first cultivation room 121 and the upper second cultivation room 122 by the first lighting module 401. Thus the plant cultivation apparatus may secure the cultivation place larger than when a separate partition is provided in the plant cultivation apparatus.

Meanwhile, the plant cultivation apparatus according to the embodiment of the present disclosure is not limited to only the structure of the above-described embodiment.

That is, in the plant cultivation apparatus according to the embodiment of the present disclosure, regardless of the structure in the machine chamber, the water tank 710 of the water supply module 700 is simply configured to be positioned at the gap between the bed 300a, 300b and the bottom surface in the inner case 120, the plant cultivation apparatus may be used as the built-in product, and the cultivation room 121, 122 may be secured to the maximum size.

The water tank 710 may be taken out forward while being exposed outward from the plant cultivation apparatus when the door 130 is opened. Thus, the user can perform the maintenance of the supply water and contamination or decay of the supply water may be prevented.

The invention claimed is:

1. A plant cultivation apparatus comprising:
a cabinet comprising a cultivation room and a door for opening and closing of the cultivation room;
a water supply module comprising a water tank positioned at a bottom in the cabinet, a water pump positioned at a rear of the water tank and pumping supply water stored in the water tank, and a first inlet hose guiding a flow of the supply liquid;
a first bed positioned above the water supply module and including a groove that is recessed from an upper surface of the first bed, the groove receiving the supply water from the water supply module;
a pod seated on the upper surface of the first bed and receiving the supply water from the groove;
a first lighting module positioned above the first bed and providing lighting for plant cultivation;
a machine chamber frame provided in a lower side of the cabinet and providing a machine chamber, the machine chamber frame including a bottom plate first and second side surface plates, and a rear surface plate;
a partition coupled to the bottom plate of the machine chamber frame to divide the machine chamber into an air inflow side between the partition and the first side surface plate, and an air outflow side between the partition and the second side surface plate, the air inflow side and the air outflow side communicating with each other between the partition and the rear surface plate;
an air conditioning module that controls a temperature in the cultivation room, the air conditioning module including an evaporator provided in front of a rear wall surface in the cabinet, and a compressor and a condenser, the condenser being provided in the air inflow side of the machine chamber, and the compressor being provided in a flow path of air that has passed through the condenser; and
a circulation fan assembly positioned in the cabinet and circulating air in the cultivation room, wherein the circulation fan assembly includes:
a partition wall provided between the evaporator and the cultivation room, the partition wall defining a lower opening between a lower edge of the partition wall and the first bed, and an upper opening between an upper edge of the partition wall and the first lighting module; and
a circulation fan provided between the partition wall and the evaporator, the circulation fan being configured to suction air from the cultivation room through the lower opening, and to blow air from the evaporator into the cultivation room through the upper opening.

2. The plant cultivation apparatus of claim 1, wherein the machine chamber frame is configured to have an open front surface, so that indoor air is suctioned and discharged through the front surface.

3. The plant cultivation apparatus of claim 2, wherein an intake and exhaust grill having an inlet and an outlet is provided on the open front surface of the machine chamber frame.

4. The plant cultivation apparatus of claim 2, wherein the partition includes a first section that extends rearward from the open front surface of the machine chamber frame, and a second section that extends at an angle from the first section toward the first side surface plate, and
wherein the condenser is provided between the first section of the partition and the first side surface plate.

5. The plant cultivation apparatus of claim 1, wherein the water supply module comprises an installation frame that is positioned between the water tank and the water pump and at which the water pump is installed.

6. The plant cultivation apparatus of claim 5, wherein the water tank is positioned at a front surface of the installation frame and is configured to be drawable from the cabinet in a drawer manner.

7. The plant cultivation apparatus of claim 6, wherein a water reservoir to receive the supply water is provided at a rear surface of the first bed, and the first inlet hose is connected to the water reservoir for supplying the supply water to the water reservoir.

8. The plant cultivation apparatus of claim 5, wherein a first residual water detection sensor is provided on an upper surface of the installation frame, the first residual water detection sensor being configured to detect whether or not the supply water supplied to the first bed remains in the first bed.

9. The plant cultivation apparatus of claim 8, wherein
the first inlet hose is configured to selectively receive the supply water from the water pump through a flow path valve, and
when the first residual water detection sensor detects that the residual portion of the remaining of the supply water the first bed, the flow path valve operates to stop supply of the supply water to the first inlet hose.

10. The plant cultivation apparatus of claim 5, wherein a first residual water detection sensor is provided, the first residual water detection sensor being configured to detect whether or not the supply water supplied to the first bed remains in the first bed,
wherein the first inlet hose is configured to selectively receive the supply water from the water pump through a flow path valve, and when the first residual water detection sensor detects the remaining of the supply water in the first bed, the flow path valve operates to stop supply of the supply water to the first inlet hose,
wherein, among portions of the first bed, a sensing protrusion is formed at the groove of the first bed, the sensing protrusion protruding upward from the groove of the first bed, and
wherein at least a part of an upper end of the first residual water detection sensor is positioned in the sensing protrusion.

11. The plant cultivation apparatus of claim 1, wherein
a second bed on which a pod is seated is provided above the first lighting module, and
a second lighting module is provided above the second bed, and
the water supply module comprises a second inlet hose supplying the supply water to the second bed.

12. The plant cultivation apparatus of claim 11, wherein the cultivation room comprises:
a first cultivation room provided for the plant cultivation of the pod seated on the first bed; and
a second cultivation room provided for the plant cultivation of the other pod seated on the second bed, and
wherein the first cultivation room and the second cultivation room are vertically partitioned by the first lighting module.

13. The plant cultivation apparatus of claim 11, wherein a second residual water detection sensor is provided on an upper surface of the second lighting module, the second residual water detection sensor being configured to detect whether or not the supply water supplied to the second bed remains in the second bed.

14. The plant cultivation apparatus of claim 13, wherein the second inlet hose is configured to selectively receive the supply water from the water pump through a flow path valve, and when the second residual water detection sensor detects the remaining of the supply water in the second bed, the flow path valve operates to stop supply of the supply water to the second inlet hose.

15. The plant cultivation apparatus of claim 1, wherein the water tank is configured as an upward open container body, an open upper surface of the water tank is configured to be opened and closed by an opening and closing cover, and the opening and closing cover is provided with a water supply connection tube connected to the water pump so as to supply the supply water stored in the water tank to the water pump.

16. The plant cultivation apparatus of claim 15, wherein the water supply connection tube comprises:
an inlet tube protruding from a lower surface of a rear side of the opening and closing cover to a bottom in the water tank; and
a connection tube extended toward a rear surface of an upper end of the inlet tube and connected to the water pump.

17. The plant cultivation apparatus of claim 1, wherein the first bed further includes a dam that is provided in the groove and that divides the groove into a first groove and a second groove that is fluidly connected to the first groove, and
wherein the supply water received from the water supply module travels along the first groove in a first direction and along the second groove in a second direction that differs from the first direction.

18. The plant cultivation apparatus of claim 1, further comprising a cooling fan provided in the machine chamber between the partition and the rear surface plate to blow air that has passed through to the condenser toward the compressor.

19. The plant cultivation apparatus of claim 1, further comprising:
- a condensed water reservoir provided on the bottom plate and below the condenser to receive condensation flowing down from the condenser.

20. The plant cultivation apparatus of claim 1,
- wherein a portion of air blown by the circulation fan flows between the door and the first bed.

\* \* \* \* \*